(12) United States Patent
Beck et al.

(10) Patent No.: US 6,354,268 B1
(45) Date of Patent: Mar. 12, 2002

(54) CYLINDER PRESSURE BASED OPTIMIZATION CONTROL FOR COMPRESSION IGNITION ENGINES

(75) Inventors: N. John Beck, Bonita; William P. Johnson, Valley Center; Kresimir Gebert, Spring Valley; Shui-Chi Li, San Diego, all of CA (US)

(73) Assignee: Servojet Products International, San Diego, CA (US)

( * ) Notice: Subject to any disclaimer, the term of this patent is extended or adjusted under 35 U.S.C. 154(b) by 0 days.

(21) Appl. No.: 09/260,175

(22) Filed: Mar. 1, 1999

Related U.S. Application Data

(63) Continuation-in-part of application No. 08/991,413, filed on Dec. 16, 1997, now Pat. No. 6,273,076.

(51) Int. Cl.⁷ ............................................... F02M 69/42
(52) U.S. Cl. ......................................... 123/435; 60/601
(58) Field of Search ............................ 123/435; 60/601, 60/603, 611

(56) References Cited

U.S. PATENT DOCUMENTS

| | | | |
|---|---|---|---|
| 4,285,200 A | 8/1981 | Byrne et al. ................... 60/607 |
| 4,314,534 A | * 2/1982 | Nakajima et al. ............ 123/438 |
| 4,364,364 A | 12/1982 | Subramaniam .............. 123/527 |
| 4,449,501 A | * 5/1984 | Greeves ....................... 123/425 |
| 4,603,674 A | 8/1986 | Tanaka ......................... 123/575 |
| 4,622,939 A | 11/1986 | Matekunas ................... 123/425 |
| 4,633,670 A | * 1/1987 | Iwasa ............................ 60/603 |
| 4,769,995 A | 9/1988 | Serve et al. .................... 60/603 |
| 4,849,897 A | 7/1989 | Ciccarone .............. 364/431.08 |
| 4,873,961 A | 10/1989 | Tanaka ......................... 123/564 |
| 4,919,099 A | * 4/1990 | Extance et al. .............. 123/425 |

(List continued on next page.)

OTHER PUBLICATIONS

SAE Paper No. 920046, *Effects of High–Boost Turbocharging on Combustion Characteristics and Improving its Low Engine Speed Torque*, Sugihara et al., pp. 1–8, 1992.

*Evolution of Heavy Duty Natural Gas Engines—Stoichiometric, Carbureted and Spark Ignited to Lean Burn, Fuel Injected and Micro–Pilot*; BKM, Inc.; N. John Beck et al. Doc. No. 972665.

*Strategies to Improve Combustion and Emission Characteristics of Dual–Fuel Pilot Ignited Natural Gas Engines*; BKM, Inc.; K. Gebert et al. Doc. No. 971712.

*GCQ—A Universal Gaseous Fuel Composition and Quality Sensor*; BKM, Inc.; N.J. Beck et al. Doc. No. SAE 932824; pp. 1–12.

(List continued on next page.)

*Primary Examiner*—Henry C. Yuen
*Assistant Examiner*—Arnold Castro
(74) *Attorney, Agent, or Firm*—Boyle Fredrickson Newholm Stein & Gratz S.C.

(57) ABSTRACT

The performance of a compression ignition internal combustion engine is improved by optimizing a cylinder pressure-dependent parameter on a full time, full range basis using in-cylinder pressure measurements to determine the actual value of the parameter to be optimized. The basic procedure is to determine the desired or optimum value of the parameter, determine the actual value of the parameter or a related parameter, and then adjusting an engine operating characteristic such as air/fuel ratio to maintain the controlled parameter at its optimum value. The preferred parameter is a cylinder pressure ratio (CPR) obtained by dividing first and second values of cylinder pressure, and sensed at different points in a thermodynamic cycle, by one another. The sensed values are preferably a first value $P_o$, obtained during the compression stroke, and a second value $P_a$, obtained after combustion is complete. Direct in-cylinder pressure measurements can also be used for other purposes such as knock detection, determination of maximum cylinder pressure (MCP), and engine controls dependent thereon.

28 Claims, 22 Drawing Sheets

U.S. PATENT DOCUMENTS

| | | | |
|---|---|---|---|
| 4,928,653 A | | 5/1990 | Ohkubo et al. ............. 123/435 |
| 4,962,739 A | * | 10/1990 | Wataya ........................ 123/435 |
| 4,971,009 A | * | 11/1990 | Washino et al. ............ 123/435 |
| 5,038,737 A | * | 8/1991 | Nishiyama et al. ......... 123/435 |
| 5,067,460 A | | 11/1991 | Van Duyne ................. 123/337 |
| 5,069,185 A | | 12/1991 | Evasick ....................... 123/435 |
| 5,103,789 A | * | 4/1992 | Hartman et al. ............ 123/435 |
| 5,123,391 A | | 6/1992 | Ohkubo et al. ............. 123/435 |
| 5,150,694 A | | 9/1992 | Currie et al. ................ 123/569 |
| 5,375,577 A | | 12/1994 | Betts, Jr. et al. ............ 123/480 |
| 5,452,087 A | * | 9/1995 | Taylor et al. ................ 356/352 |
| 5,454,360 A | | 10/1995 | Shimizu et al. ............. 123/564 |
| 5,458,102 A | | 10/1995 | Tomisawa et al. .......... 123/435 |
| 5,471,965 A | | 12/1995 | Kapich ........................ 123/565 |
| 5,526,645 A | | 6/1996 | Kaiser .......................... 60/611 |
| 5,553,575 A | | 9/1996 | Beck et al. .................. 123/198 |
| 5,608,161 A | | 3/1997 | Pischinger ................. 73/117.3 |
| 5,765,532 A | | 6/1998 | Loye ........................... 123/435 |

OTHER PUBLICATIONS

*Dual Fuel Natural Gas/Diesel Engines: Technology, Performance, and Emissions*; Engine, Fuel, and Emissions Engineering, Inc., C. Weaver et al. Doc. No. 940548; pp. 77–92.

*Schwitzer Variable Geometry Turbo and Microprocessor Control Design and Evaluation*; SAE Technical Paper Series; Doc. No. 870296; Feb. 23–27, 1987; pp. 1–12.

*Advanced Fuel Economy in Hino New P11C Turbocharged and Charge–Cooled Heavy Duty Diesel Engine*; SAE Technical Paper Series; Doc. No. 930272; Mar. 1–5, 1993; pp. 49–60.

*Engine Control Using Cylinder Pressure: Past, Present, and Future*; J. David Powell; Journal of Dynamic Systems, Measurement, and Control; Jun. 1993, vol. 115, pp. 343–350.

*State–of–the–Art; Hino High Boosted Diesel Engine*; SAE Technical Paper Series; Doc. No. 931867; Nov. 15–19, 1993; pp. 1–15.

*A New Generation Variable Turbine Geometry Turbocharger for Highly Rated Diesel Truck Engines*; Rochford et al.; Allied Signal Incorporated; Paper No. 234; Nov. 4–9, 1995; pp. 1–4.

S.P. Edwards, A.D. Pilley, S. Michon, and G. Fournier; *The Optimisation of Common Rail FIE Equipped Engines Through the Use of Statistical Experimental Design, Mathematical Modelling and Genetic Algorithms*; Society of Automotive Engineers, Inc.; 1997; pp. 143–161.

SAE Paper No. 972676, *High Speed Hydraulic Turbine Driven Supercharger System and Controls Optimization*, Kapich, pp. 77–82, 1997.

SAE Paper No. 981913, *In–Cylinder Fiber–Optic Pressure Sensors for Monitoring and Control of Diesel Engines*, Wlodarczyk et al., pp. 36–42, 1998.

S.P. Edwards, A.D. Pilley, S. Michon, and G. Fournier; *The Optimisation of Common Rail FIE Equipped Engines Through the Use of Statistical Experimental Design, Mathematical Modelling and Genetic Algorithms*; Society of Automotive Engineers, Inc.; 1997; pp. 143–161.

\* cited by examiner

□ 1750 FULL LOAD
○ 1600 FULL LOAD
△ 1400 FULL LOAD
▽ 1200 FULL LOAD
↑ 1020 FULL LOAD

CYLINDER PRESSURE BASED OPTIMIZATION CONTROL FOR COMPRESSION IGNITION ENGINES

CROSS REFERENCE TO A RELATED APPLICATION

This is a continuation-in-part of U.S. patent application Ser. No. 08/991,413, filed Dec. 16, 1997 in the name of Beck et al., now U.S. Pat. No. 6,273,076.

BACKGROUND OF THE INVENTION

1. Field of the Invention

The invention relates to the control of internal combustion engines and, more particularly, relates to a method and apparatus that uses in-cylinder pressure measurements to determine the value of a pressure-dependent operating parameter and that adjusts engine operation to maximize that or a related parameter.

2. Discussion of the Related Art

It is well known that the relative proportion of fuel and air has a marked effect on the combustion process in any internal combustion engine. An engine operating on less than a stoichiometric air/fuel ratio will emit unacceptable levels of unburnt fuel and related emissions. It is for this reason that many engines incorporate measures to supply at least as much air to the engine as is required for stoichiometric combustion. The proportion of air in excess of that required for stoichiometric combustion is known as the excess air ratio or "lambda", which is defined as the ratio of total air available for combustion to that required to burn all of the fuel. It is well known that, if lambda drops below a minimum threshold, oxides of nitrogen ($NO_x$) and other emissions increase to unacceptable levels.

Current emissions-regulated, gasoline-fueled Otto cycle (spark ignited) engines invariably use full time lambda control. These engines typically use a catalytic converter having a three way catalyst to reduce emissions. In order to permit the three way catalyst to perform in spark ignition engines, lambda is controlled to a value of 1.00 by use of an exhaust oxygen sensor, usually in a closed loop control mode to hold lambda as close to unity (i.e., one or a stoichiometric ratio) as is practical.

It has also been recognized that at least limited lambda control is important in the operation of unthrottled gas-fueled engines. For instance, U.S. Pat. No. 5,553,575 to Beck et al. (the Beck '575 patent) proposes lambda control by skip fire in an unthrottled gas fueled engine with the number of cylinders skipped being calculated to optimize as much as possible lambda under prevailing engine operating conditions. Optimum lambda is calculated experimentally based upon prevailing engine operating parameters including mean effective pressure (MEP), air charge temperature (ACT), intake manifold absolute pressure (MAP), gas fuel charge quantity, ignition timing, exhaust back pressure (EBP), etc. The number of cylinders to be skipped to obtain this lambda then is calculated. That number of cylinders then is skipped in the next thermodynamic cycle. Lambda then is "fine tuned" by varying manifold absolute pressure (MAP). However, skip fire is considered to be the primary mode of control when less than all cylinders are firing.

The Beck '575 patent states that lambda control is considered unnecessary in diesel engines because diesel engines have "an extremely broad range of useful lambdas." The comments in the Beck '575 patent are typical of traditional thinking with respect to diesel engines. For diesel and other compression ignition engines, it is generally assumed that, so long as lambda is high enough, no other adjustment is required. In fact, for compression ignition diesel engines with modern electronic controls, the value of lambda seldom appears in the calibration tables, let alone in a closed loop control strategy. Even those who have recognized some of the benefits of lambda control have failed to recognize the benefits of full time, full range lambda optimization. Hence, while it recently has been recognized that the performance of compression ignition engines can be enhanced by increasing lambda, there is no suggestion in the art to modulate lambda to avoid exceeding an upper limit of lambda.

For instance, SAE Technical Paper 930272 by Hino Motors, Ltd. (the Hino '272 paper) and SAE Technical Paper 931867 by Hino Motors, Ltd. (the Hino '867 paper) recognize that smoke (BSU) emissions and brake specific fuel consumption (BSFC) decrease as lambda increases. Specifically, the Hino '867 paper reported that, as the boost supplied by the turbocharger of a turbocharged diesel engine was increased to increase lambda from 1.6 to 2.2, both BSU and BSFC dropped substantially at a given $NO_x$ emission level. Reduction of BSU with increased lambda and constant $NO_x$ is reflected by the curves 22, 24, 26, and 28 in FIG. 1. Reduction of BSFC with increased lambda and constant $NO_x$ is reflected by the curves 30, 32, 34, and 36 in FIG. 2. The Hino '272 paper reported significant decreases in ignition delay and combustion duration with increased turbocharger boost and consequent increase in lambda. The implicit conclusion reached by both papers was that optimal operation always results from increasing turbocharger boost as much as feasible so as to increase lambda to a maximum practical level. Neither paper recognized that lambda could be too high or that there might be an optimum lambda for a particular engine operating condition that is less than the maximum available lambda, and neither paper sought to modulate a turbocharger or other engine component to optimize lambda on a full time, full-range basis. Nor did either paper discuss the effects of ACT on the operation of a compression ignition engine or the interaction between lambda and ACT.

The effects of lambda variation on a compression ignition engine also were investigated by SAE Technical Paper 870296 to Arnold (the Arnold paper). The Arnold paper discusses the effects of the control of a variable power turbine (VPT) on the performance of a diesel engine. Arnold's experiments began with the mapping of altered boost levels across the engine's speed and load ranges. An array of speed and fuel flows were chosen that covered the lug line from idle to rated speed and also covered loads ranging from ¼ load to full load from the idle speed to the rated speed. The results of these experiments are summarized in FIG. 3 which illustrates a plot of BSFC against air-fuel ratio at full load. The curves 40, 42, 44, 46, and 48 plot the results at 1750 rpm, 1600 rpm, 1400 rpm, 1200 rpm, and 1020 rpm, respectively. Arnold noted that all of these curves flatten out or reduce slope in roughly the same air-fuel ratio range of 26.5:1 to 31:1.

Arnold concluded that, very much like a gasoline engine, a diesel engine prefers a constant air-fuel ratio and that, while this optimum value varies considerably based on a particular engine design, it usually falls between 26.5:1 and 31:1. Arnold failed to carry his experiments one step further and therefore did not appreciate that deleterious effects occur under some operating conditions if lambda increases above a threshold value. Hence, while the Arnold paper, like the Hino papers, recognized that increasing lambda to something in excess of stoichiometric ratios is desirable during operation of a diesel engine, it failed to recognize that optimum lambda varies with prevailing engine operating parameters including engine speed and that a given air supply system therefore could sometimes supply too much air to the engine under what otherwise might be considered an "optimum" setting. Arnold also failed to address the effects of ACT on engine performance as well as the interplay between ACT and lambda.

Therefore, even in systems such as those disclosed by Hino '867, Hino '272, and Arnold which seek to adjust air supply to enhance engine performance, the air supply typically is adjusted only to be high enough to prevent excessive smoke and BSFC. These and others who have addressed the issue of lambda control failed to recognize that, if lambda rises above a maximum acceptable threshold, incomplete combustion can occur, resulting in excessive unwanted emissions and decreased thermal efficiency. Thus, the search for a truly optimum value of lambda over the entire operating range of the engine has been largely ignored until now. The inventors have recognized that it is essential for optimum control of combustion in an internal combustion engine to maintain lambda values within a permissible range, and preferably to cause lambda values to be adjusted to optimum levels.

ACT control for optimizing engine performance has similarly been ignored or at least underrated. Control of ACT had previously been directed largely to reducing the high temperature emanating from the turbocharger compressor by means of an intercooler. Little attention was given to the possible beneficial effects of decreasing ACT below ambient temperature or of increasing ACT above ambient temperature under certain operating conditions such as light load and/or low ambient temperatures.

Conventional diesel engines therefore typically operate at higher than optimum ACT and lower than optimum lambda when at high load and at higher than optimum lambda and lower than optimum ACT when at light load. Consequently, diesel engines have rarely if ever been operated at truly optimum lambda or optimum ACT over the entire engine operating range. In fact, it would be only accidental if the conventional diesel engine were to operate at optimum lambda or optimum ACT values at any operating point in the engine's load/speed ranges.

Some concerted effort will be required to meet future emission regulations for diesel engines, such as EPA 2004 proposed by the United States Environmental Protection Agency. Some of the previously-proposed techniques include 1) exhaust gas recirculation (EGR), 2) particulate traps and, 3) special fuels and fuel additives. All of these techniques are both complex and costly. In addition, all of these techniques are directed more at correcting the deficiency (inadequate lambda control) rather than preventing the deficiency from occurring in the first place. It is not yet appreciated that a combination of full time, full range lambda control, improved fuel injection, and improved combustion temperature control through ACT control has the potential to obviate the need for these additional corrective techniques. Even if some of these corrective techniques are used, it appears logical that the optimization of lambda and ACT should be accomplished prior to the addition of some of these more severe techniques.

Other patents disclose the control of spark ignition engines based on in-cylinder pressure measurements. All measurements and calculations are applicable only to engines fueled by a spark-ignited, premixed fuel charge. None of these patents disclose a system usable in compression ignition engines fueled with heterogeneous fuels.

For instance, Loye et al., U.S. Pat. No. 5,765,532, measures a first value $P_c$ of cylinder pressure late in the compression stroke and another value $P_b$ early enough in the combustion process to obtain a cylinder pressure ratio CPR indicative of burn rate. Loye observes that, for a premixed charge, it can be shown that lambda is related to burn rate. Hence, a calibration table can be used to determine the optimum CPR for the desired operation conditions, and lambda can then be adjusted to maintain the CPR at the optimum value. The pressures utilized by Loye et al. are shown on the Log P vs. Log V chart in FIG. 19.

Matekunas, U.S. Pat. No. 4,622,939, also discloses in-cylinder pressure measurement in a spark ignition engine. In Matekunas, a first value $P_o$ of cylinder pressure is measured relatively early in the compression stroke at a selected crank angle before top center, and a second value $P_a$ is measured at another point after completion of the combustion process. A ratio of these two pressures, CPR, is then compared to a calibration table in which this ratio is correlated to optimum ignition timing. Spark timing is then adjusted to obtain a CPR that is posted in a calibration table to be related to maximum engine power. The pressures $P_o$ and $P_a$ utilized by Matekunas are shown schematically in the Log P vs. Log V chart of FIG. 19. It should be noted that these pressures and the resultant CPR are not the same as those used by Loye.

Hamburg et al., U.S. Pat. No. 4,736,724, measures cylinder pressure continuously in a spark ignition engine. It then calculates, using the cylinder pressure measurements, the rate and duration of heat release and compares the calculated burn rate and duration to a predetermined optimum burn rate and duration. It then adjusts lambda to maintain this optimum burn rate and duration. The pressures utilized by Hamburg are continuous pressures between $P_o$ and $P_a$ in the Log P vs. log V chart of FIG. 19)).

Nishiyama et al., U.S. Pat. No. 4,996,960, measures two values $P_o$ and $P_c$, of cylinder pressure, both occurring before top dead center on the compression stroke and prior to combustion. Nishiyama recognizes that the ratio CPR of these two pressures is a function of the polytropic compression coefficient, which is in turn a function of lambda in a spark ignition engine. Nishiyama then concludes that CPR can be compared to a calibration table and adjusted by referring to the effect on CPR. The pressures $P_o$ and $P_c$ used by Nishiyama et al., are shown on the Log P vs. Log V chart of FIG. 19. This technique, like the others discussed above, is not applicable to compression-ignition engines.

OBJECTS AND SUMMARY OF THE INVENTION

It is therefore a first principal object of the invention to use real time, in-cylinder pressure measurements to optimize operation of a compression ignition engine.

This object is achieved by 1) directly sensing pressure within a cylinder of the compression ignition engine during engine operation, 2) determining, from the measurement, an actual cylinder pressure-dependent parameter of the engine prevailing at the time of the measurement, 3) determining an optimum value of the parameter for optimizing a selected engine performance characteristic at a prevailing engine operating condition, and 4) automatically adjusting at least one engine operating characteristic so as to optimize the parameter.

Preferably, the parameter is a cylinder pressure ratio CPR obtained by measuring one pressure, $P_o$, during the compression stroke and another pressure, $P_a$, after the end of combustion and by dividing $P_a$ by $P_o$ to obtain CPR. The calculated CPR is then compared to a pre-determined optimum value, and lambda is adjusted to achieve the pre-determined optimum CPR.

A second principal object of the invention is to provide a compression ignition engine which uses real time, in-cylinder pressure measurements to optimize operation of the engine.

In accordance within another aspect of the invention, this object is achieved by providing a compression ignition internal combustion engine comprising 1) a plurality of cylinders each having an intake port and an exhaust port, 2) a fuel supply system which selectively supplies a fuel to the cylinders, 3) an air supply system which supplies air to the intake ports of the cylinders during engine operation, 4) a sensor which directly senses pressure within at least one of the cylinders, and 5) an electronic controller. The controller determines, based upon signals received from the sensor, an actual cylinder pressure-dependent parameter of the engine prevailing at the time of the measurement, determines an optimum value of the parameter for optimizing a selected engine performance characteristic at a prevailing engine operating condition, and automatically adjusts at least one engine operating parameter so as to cause the actual value of the characteristics to approach the optimum value of the characteristics.

Other objects, features, and advantages of the present invention will become apparent to those skilled in the art from the following detailed description and the accompanying drawings. It should be understood, however, that a detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Résumé

Pursuant to the invention, the performance of a compression ignition internal combustion engine is improved by optimizing a cylinder pressure-dependent parameter on a full time, full range basis using in-cylinder pressure measurements to determine the actual value of the parameter to be optimized. The basic procedure is to determine the desired or optimum value of the parameter, determine the actual value of the parameter or a related parameter, and then adjust an engine operating characteristic such as air/fuel ratio (lambda) to maintain the controlled parameter at its optimum value. The preferred parameter is a cylinder pressure ratio (CPR) obtained by dividing first and second values of cylinder pressure, sensed at different points in a thermodynamic cycle, by one another. The sensed values are preferably a first value $P_o$, obtained during the compression stroke and a second value $P_a$, obtained after combustion is complete. Direct in-cylinder pressure measurements can also be used for other purposes such as knock detection, determination of maximum cylinder pressure (MCP), and engine controls dependent thereon.

2. System Overview

The invention is applicable to virtually any compression ignition engine including dual fuel and other gaseous fueled engine as well as traditional diesel engines. The invention is particularly well-suited for use with a turbocharged diesel engine having a supercharger in series with the turbocharger compressor. The series supercharger can be used to increase or augment the manifold absolute pressure (MAP) and hence the air supply to the engine beyond that which would otherwise be available from the turbocharger. The addition of a series supercharger also facilitates the use of a turboexpander to reduce air charge temperature (ACT) when desired. A supercharger therefore can be selectively controlled, in combination with the downstream turbocharger, to vary the air supply to the engine's intake manifold to virtually any desired level. A series supercharger for turbocharger augmentation is disclosed, for example, in U.S. Pat. No. 5,471,965 to Kapich, the subject matter of which hereby is incorporated by reference in its entirety.

Figure 1:
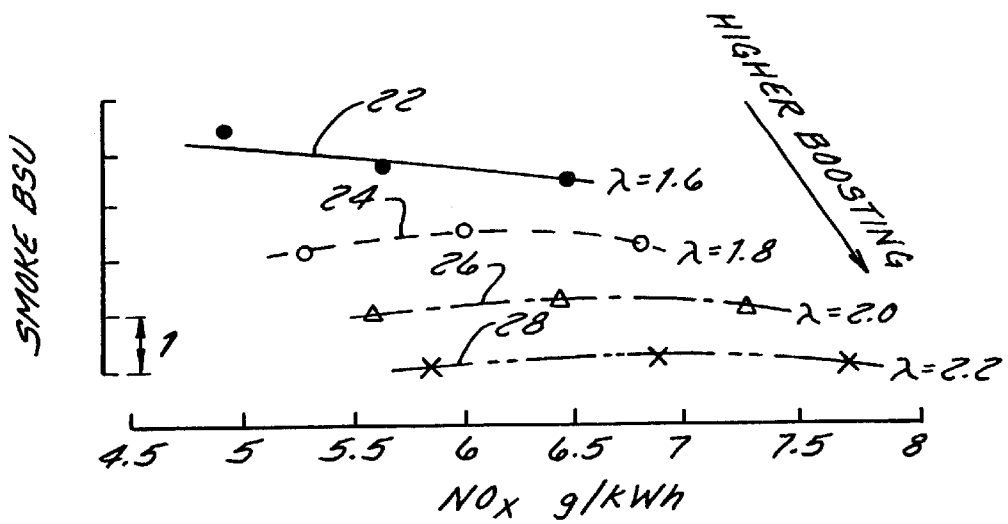
FIG. 1 is a graph of smoke (BSU) versus $NO_x$ at various lambda settings, labelled "Prior Art"
Figure 2:
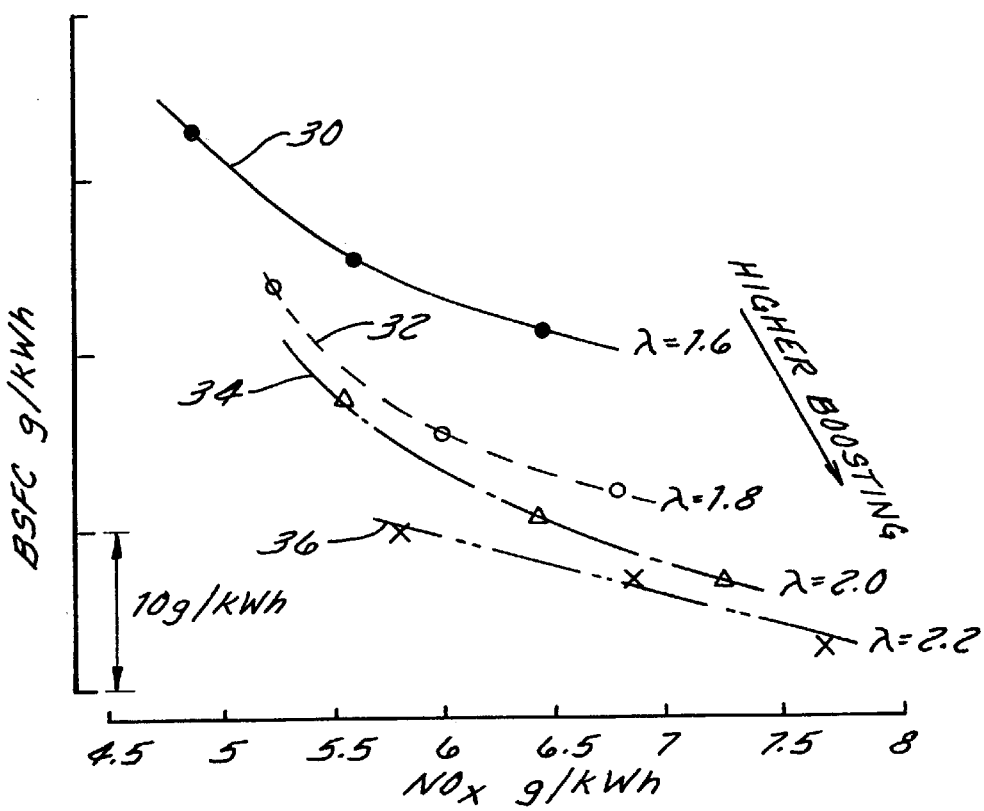
FIG. 2 is a graph of BSFC versus $NO_x$ at various lambda settings, labelled "Prior Art"
Figure 3:
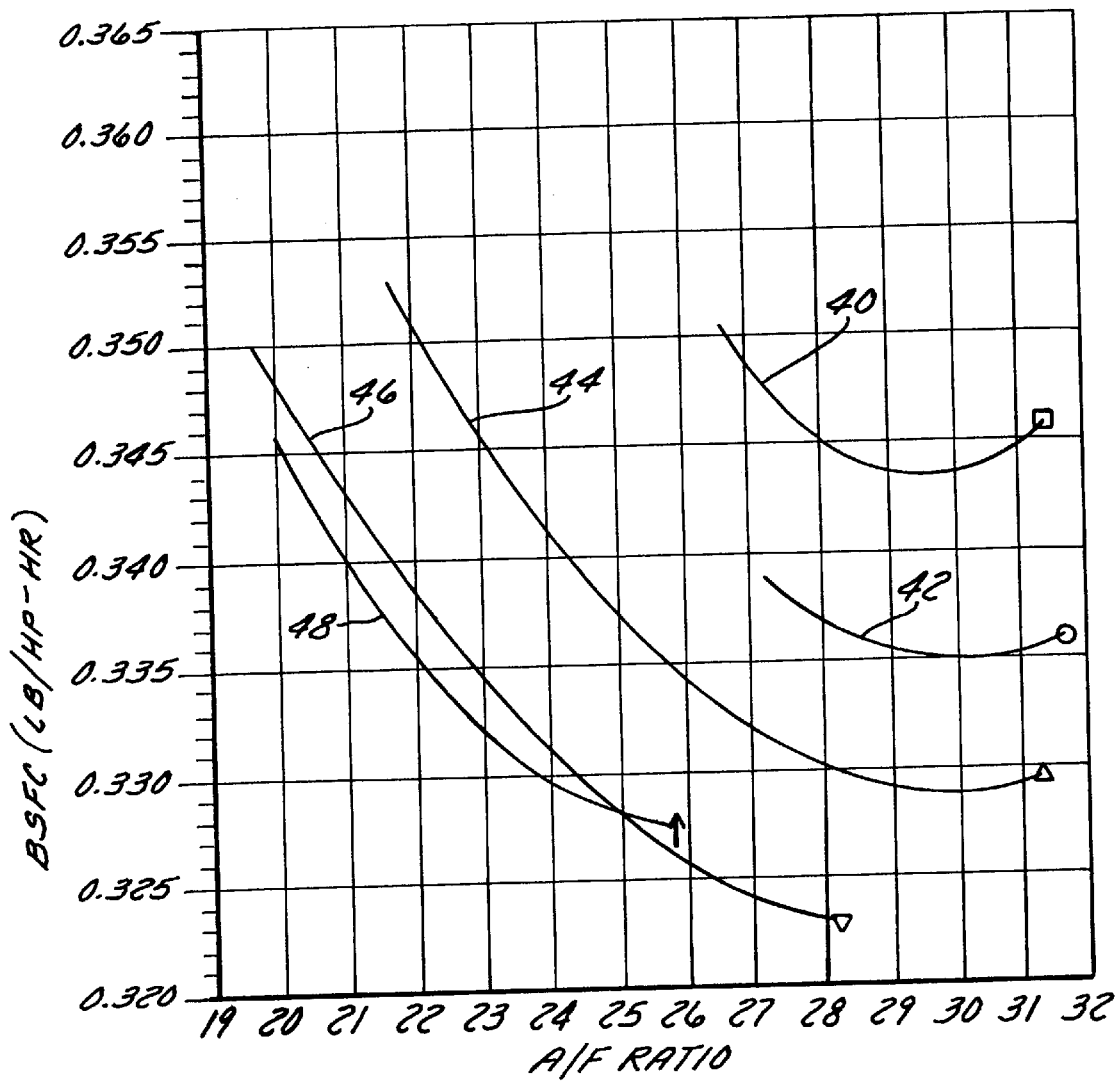
FIG. 3 is a graph of BSFC versus air/fuel ratio (lambda) at various engine speeds at full load, labelled "Prior Art"
Figure 4:
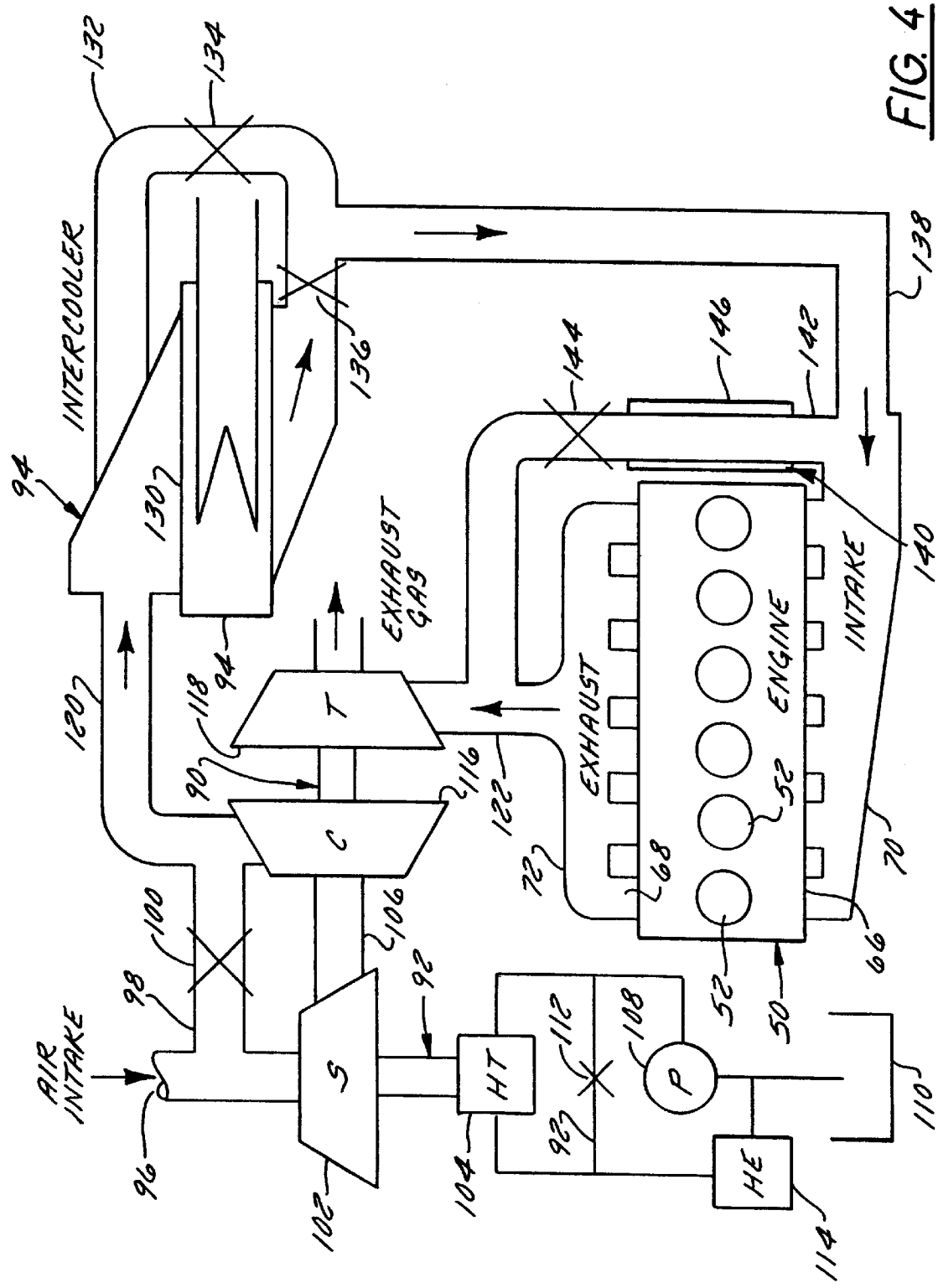
FIG. 4 is a schematic representation of an air supply system of a diesel engine constructed in accordance with a first preferred embodiment of the invention.
Figure 5:
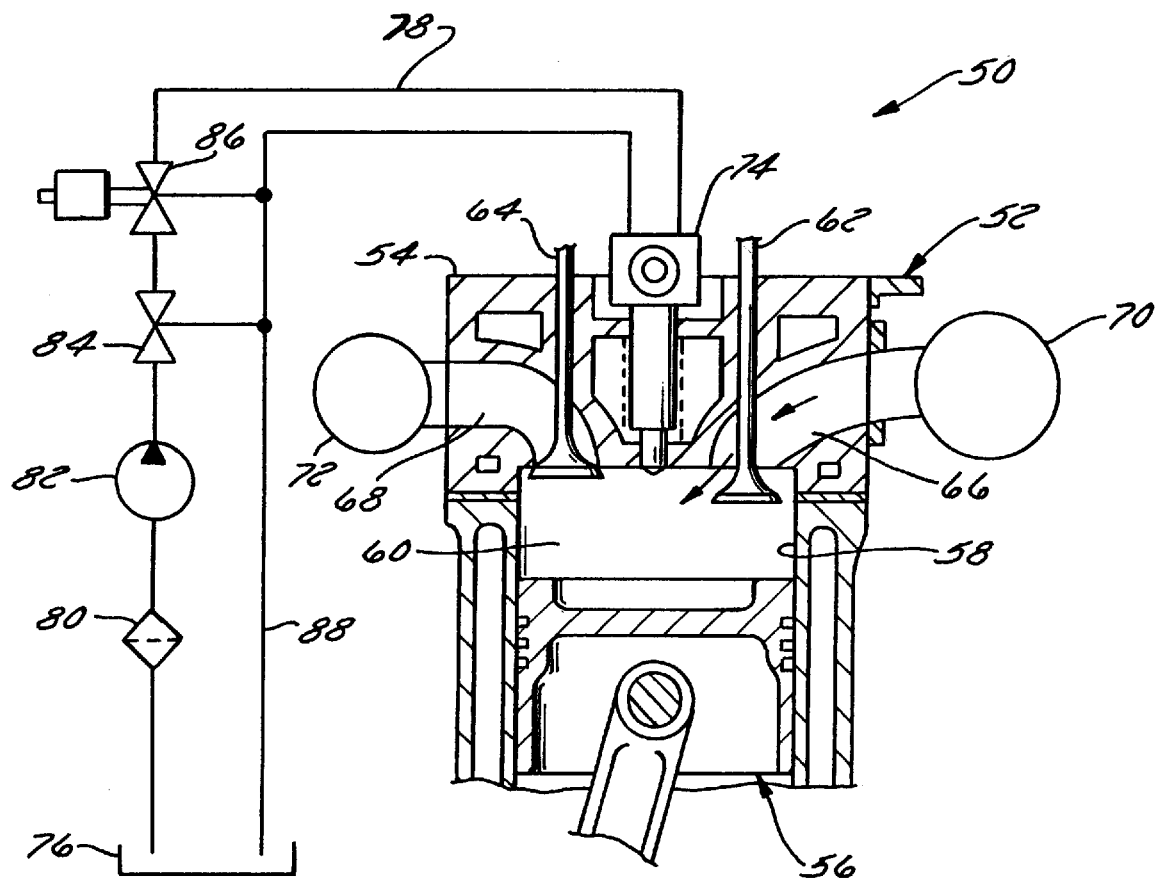
FIG. 5 is a partially schematic sectional elevation view of a cylinder of the engine of FIG. 4.

Referring now to FIGS. 4 and 5, a diesel engine 50 is schematically illustrated with which the present invention is applicable. Engine 50 includes a plurality of cylinders 52 each capped with a cylinder head 54 (FIG. 5).

In the preferred embodiment, optimization of lambda and/or ACT is achieved at least in part through the cylinder by cylinder and cycle by cycle control of airflow to the engine's air intake manifold 70. FIG. 4 illustrates a first embodiment of an air intake system or air supply system suitable for this task. This system includes a turbocharger 90, a series supercharger 92, and an intercooler assembly 94. This system is supplied with air by an air intake line 96. A bypass line 98 bypasses the turbocharger 90 and supercharger 92. A turbo air bypass (TAB) valve 100 is located in the bypass line 98 so that the fraction of incoming air that bypasses the supercharger 92 and turbocharger 90 can be varied as detailed below.

The supercharger 92, which may be any conventional compressor type used but which preferably is of the type disclosed in the Kapich patent, has a compressor 102 and a turbine 104 which drives the compressor 102 to increase the pressure of air flowing through the compressor 102. The compressor 102 has 1) an air inlet connected to a supercharger inlet branch 96 of the air intake line and 2) an air outlet connected to a supercharger discharge line 106. The turbine 104 is driven by a variable flow hydraulic source to control the compressor output. In the illustrated embodiment, the drive device comprises a variable pressure hydraulic drive including a pump 108 receiving hydraulic fluid from a reservoir 110. The pump 108 may be driven by a variable speed, electronically controlled motor or (as in the illustrated embodiment) may have its output varied by operation of an electronically controlled, variable-position control valve 112. In use, pressurized fluid from the pump 108 drives the turbine 104 at a speed determined by the effective outlet pressure of the pump 108, and the turbine 104 in turn drives the compressor 102 to boost the pressure of air flowing through the compressor 102. The effective outlet pressure of the pump 108 is modulated by modulation of the supercharger control valve 112. Hydraulic fluid exiting the turbine 104 is cooled in an oil cooler 114 before returning to the reservoir 110 for reuse by the pump 108.

The disclosed hydraulic drive for the supercharger 92 could be replaced by any suitable electric, pneumatic, or other drive so long as the drive varies the power to the turbine 104 on a demand basis. A mechanical engine-driven device could also conceivably work but would impose high parasitic losses on the engine when supplemental air is not required.

The turbocharger 90 may be any conventional turbocharger of the type used in diesel engines but preferably has a variable nozzle turbine (VNT) of the type disclosed in Rochford et al., "A Next Generation Variable Turbine Geometry Turbocharger for Highly Rated Diesel Track Engines", Paper No. 34, Eighth International Pacific Conference of Automotive Engineering, Nov. 4–9, 1995. The turbocharger 90 includes a compressor 116 and a turbine 118 which drives the compressor 116. The compressor 116 has an air inlet connected to the supercharger discharge line 106 and an air outlet connected to an intercooler feed line 120. The turbine 118 has an inlet connected to an exhaust line 122 and an outlet connected to the atmosphere. As is conventional in the art, exhaust gases flowing through the turbine 118 drive the compressor 116 so that the pressure of air entering the compressor inlet from the line 106, having been pre-boosted to an extent by the supercharger 92, is boosted additionally before being discharged into the intercooler feed line 120.

The purpose of the TAB valve 100 is to modulate turbocharger compressor outlet pressure The illustrated valve 100 is an electronically controlled, variable position valve that can be set to adjust the quantity of airflow that recirculates back to the air intake line 96 in order to reduce MAP. This valve could, if desired, be supplemented with or replaced by a variable nozzle turbine (VNT) or by a conventional waste gate that permits partial or complete bypass of the turbocharger's turbine 118 by exhaust gases flowing through the exhaust line 122. In addition, the power supplied to the series supercharger 92 typically will be reduced as a first adjustment to reduce MAP. In addition, an EGR pump, similar in design and operation to the hydraulic supercharger, may be used in lieu of an EBP valve.

It can thus be seen that the pressure in the line 120 (and hence the MAP) will depend upon 1) the setting of the supercharger control valve 112 and the corresponding inlet air pressure modulation by adjusting the area of the variable nozzle turbine, VNT, the turbocharger 90 and 2) the setting of the TAB valve 100 and/or the VNT.

The purpose of the intercooler assembly 94 is to permit selective reduction of the air charge temperature (ACT). The assembly 94, which has an inlet connected to the intercooler feed line 120 and an outlet connected to a feed line 138 for the air intake manifold 70, includes a conventional intercooler 130 (i.e., an air-to-air heat exchanger that exchanges heat with the ambient air to cool intake air flowing therethrough) located in parallel with an intercooler bypass line 132. An intercooler bypass valve 134 is disposed in the intercooler bypass line 132, and an intercooler control valve 136 may, if desired, be disposed at the exit of the intercooler 130. The valves 134 and 136 are electronically actuated valves operated inversely with respect to one another to cause the fraction of supply air bypassing the intercooler 130 to vary from 0 to 100 with consequent increase of ACT. ACT can be increased further by turbocharger control and supercharger control. For example, use of maximum supercharger input power with supercharger air bypassed back to the inlet 96 and both the supercharger 92 and the turbocharger 90 fully bypassed will result in maximum increase in ACT. This procedure can be particularly useful for cold start and idle conditions.

Although not essential or perhaps even desirable to the operation of the present invention, an exhaust gas recirculation (EGR) subassembly 140 may be provided to supplement the effects of lambda control and ACT control. The EGR subassembly 140 includes an EGR line 142 leading from a branch of the exhaust line 122 and to the air intake manifold feed line 138. Disposed in the EGR line 142 are an EGR valve 144 and an EGR cooler assembly 146. The EGR valve 144 is an electronically controlled, variable position metering valve. The percentage of the total available EGR gases flowing into the intake manifold 70 may vary from 0 to 100% depending upon the setting of the EGR valve 144. However, normal EGR values rarely exceed 50%. In addition, an exhaust back pressure (EBP) valve (not shown) having an adjustable flow-restricting metering orifice may be provided in the exhaust gas stream to control the exhaust gas absolute pressure (EGAP) in order to force EGR to flow against the prevailing MAP.

Figure 6:
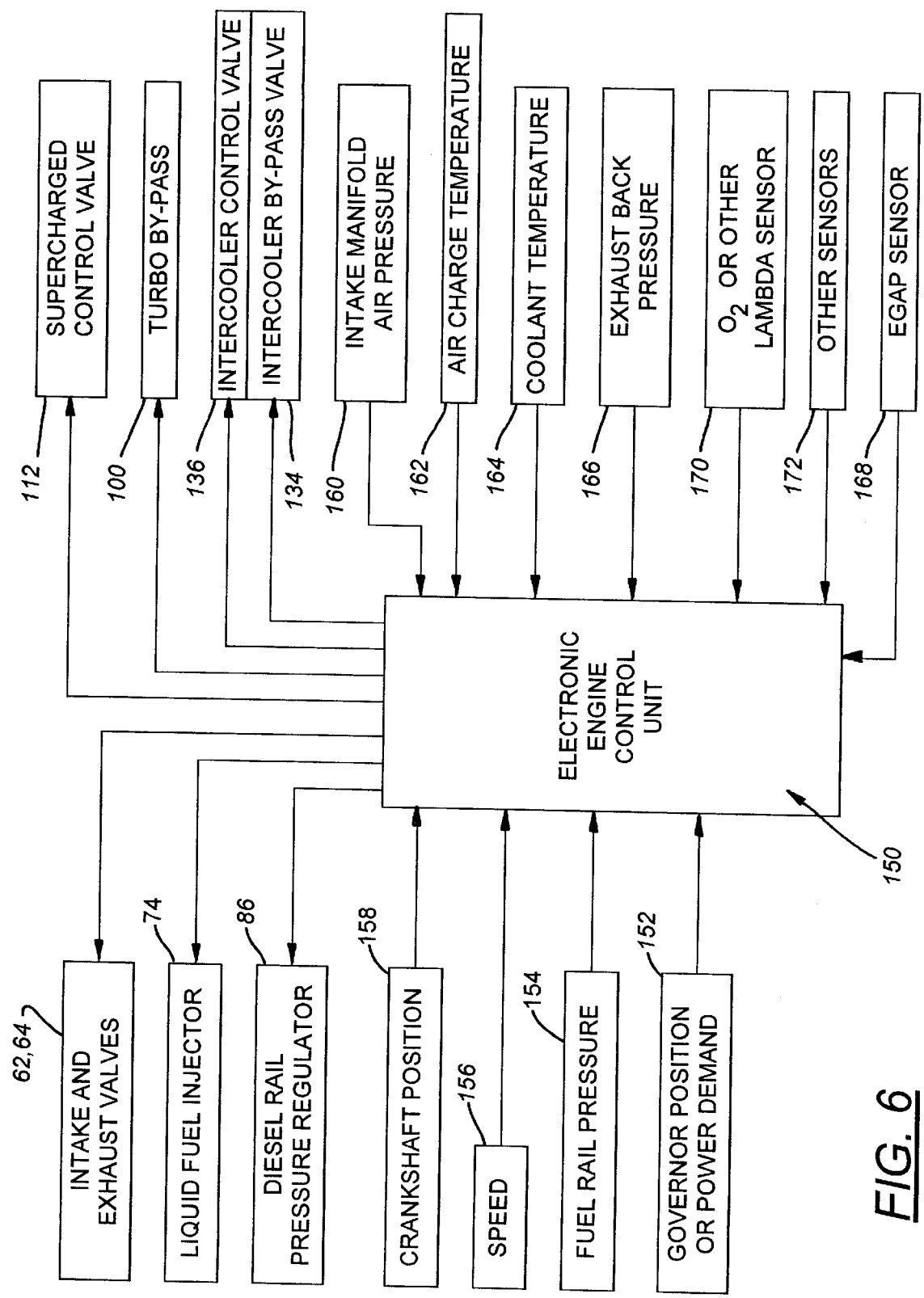
FIG. 6 is a schematic view of the sensors and electronic controls of the engine of FIGS. 4 and 5.

The supercharger control valve 112, TAB valve 100, intercooler bypass valve 134, intercooler control valve 136, EGR valve 144, and other electronically-controlled engine components are controlled by operation of a conventional programmed electronic control unit (ECU) 150 represented schematically in FIG. 6. The ECU 150 may comprise any electronic device capable of monitoring engine operation and of controlling the supply of fuel and air to the engine 50. In the illustrated embodiment, ECU 150 comprises a programmable digital microprocessor. The ECU 150 receives signals from various sensors including a governor position or other power command sensor 152, a fuel rail pressure sensor 154, an engine speed (rpm) sensor 156, a crankshaft position sensor 158, an intake manifold absolute pressure (MAP) sensor 160, an intake manifold air charge temperature (ACT) sensor 162, an engine coolant temperature sensor 164, an EBP sensor 166, and an EGAP sensor 168.

ECU 150 also ascertains actual lambda on a cylinder by cylinder and cycle by cycle basis. Lambda may be ascertained mathematically from a calibrated fuel flow together with a determination of air flow using a speed density calculation using input from one or more of the sensors, 152–168 and/or may be measured somewhat more directly using a lambda sensor 170. This sensor 170, if provided, may for instance comprise a sensor which measures oxygen concentration in the exhaust stream of the associated cylinder 52 and which can be used to calculate the value of lambda by use of a calibration table which correlates oxygen concentration with excess air ratio at the commanded fuel flow into the cylinder 52. Alternatively, the sensor 170 could comprise a mass flow sensor which determines the mass flow of air and fuel into the engine 50.

The ECU 150 manipulates data from sensors 152–170, as well as data from any other required sensors as represented collectively by block 172 in FIG. 6, and transmits output signals for controlling the flow of fuel and air to the engine 50 on a cycle by cycle and cylinder by cylinder basis. Fuel supply is controlled by the electronic control of the rail pressure regulator 86 and the individual fuel injectors 74. Air supply is controlled by the control of the TAB valve 100, the supercharger control valve 112, the turbocharger VNT, the intercooler control valve 136 (if present), and the intercooler bypass valve 134. If the intake and exhaust valves 62 and 64 are electronically controlled, both fuel supply and air supply also can be modulated by suitable control of these valves.

Pursuant to the invention, the controller or ECU 150 1) receives the signals from the various sensors 152–172, 2) performs calculations based upon these signals to determine optimum lambda, ACT, and possibly other engine operating parameters under prevailing engine operating conditions, and 3) controls the supply of both air and fuel to the engine 50 so as to optimize these values on a cycle by cycle and cylinder by cylinder basis—preferably in a closed loop and on a full time, full range basis. Possible control schemes now will be detailed.

3. Basic Lambda Control Scheme

At the core of the invention is the full time, full range control of lambda so as to maintain a selected engine performance characteristic (such as a trade-off between emissions and fuel economy) on a cylinder by cylinder and cycle by cycle basis at a desired optimum value under prevailing engine operating conditions. Combustion temperature also is preferably varied, preferably by controlling ACT (possibly aided by intake and exhaust valve control) and even more preferably in combination with lambda control. Skip fire may also be used to make coarse adjustments in lambda followed by modulation of MAP and ACT to fine-tune engine control.

Preferably, lambda is adjusted primarily by modulating MAP through suitable adjustment of the supercharger control valve 112 and/or the TAB valve 100. Pressure modulation is preferred (at least as part of lambda control) because 1) it does not require highly specialized equipment and 2) it also permits control of the air charge density. Air charge density modulation is desirable because fuel penetration is inversely proportional to air charge density. If MAP and the resultant air charge density are less than optimal, the spray penetration can be too high (resulting in wall wetting) or too low (resulting in incomplete mixing).

In addition to being adjusted by modulation of MAP, lambda can also be adjusted by modulation of ACT. ACT modulation and the resultant compression temperature modulation also have independent benefits detailed in Section 4 below.

A preferred process for lambda optimization by MAP modulation now will be detailed on the assumption that the process is performed automatically by the ECU 150, it being understood that the process could also be performed automatically or semi-automatically by other means.

The lambda control is accomplished by 1) combining signals from sensors 160, 162, 168, 170, etc. to determine the actual value of lambda by determining the actual airflow and the ratio of actual airflow to commanded fuel flow, and then 2) comparing the actual value of lambda to the predetermined desired or optimum value of lambda. The error signal between actual lambda and desired optimum lambda then can be used in a closed loop strategy to control operation of the supercharger control valve 112, the TAB valve 100, and the valves 134 and 136 controlling airflow to the intercooler assembly 94 to raise or lower lambda a required.

During transient operation, the fuel flow can be temporarily adjusted (by control of the injectors 74 and/or the rail pressure regulator 86) to be different from the commanded fuel flow in order to maintain operation at optimum lambda during transient conditions by matching actual fuel flow to the prevailing actual airflow. During steady-state operation, optimum lambda can usually be achieved by closed loop control of MAP and ACT.

Figure 11:
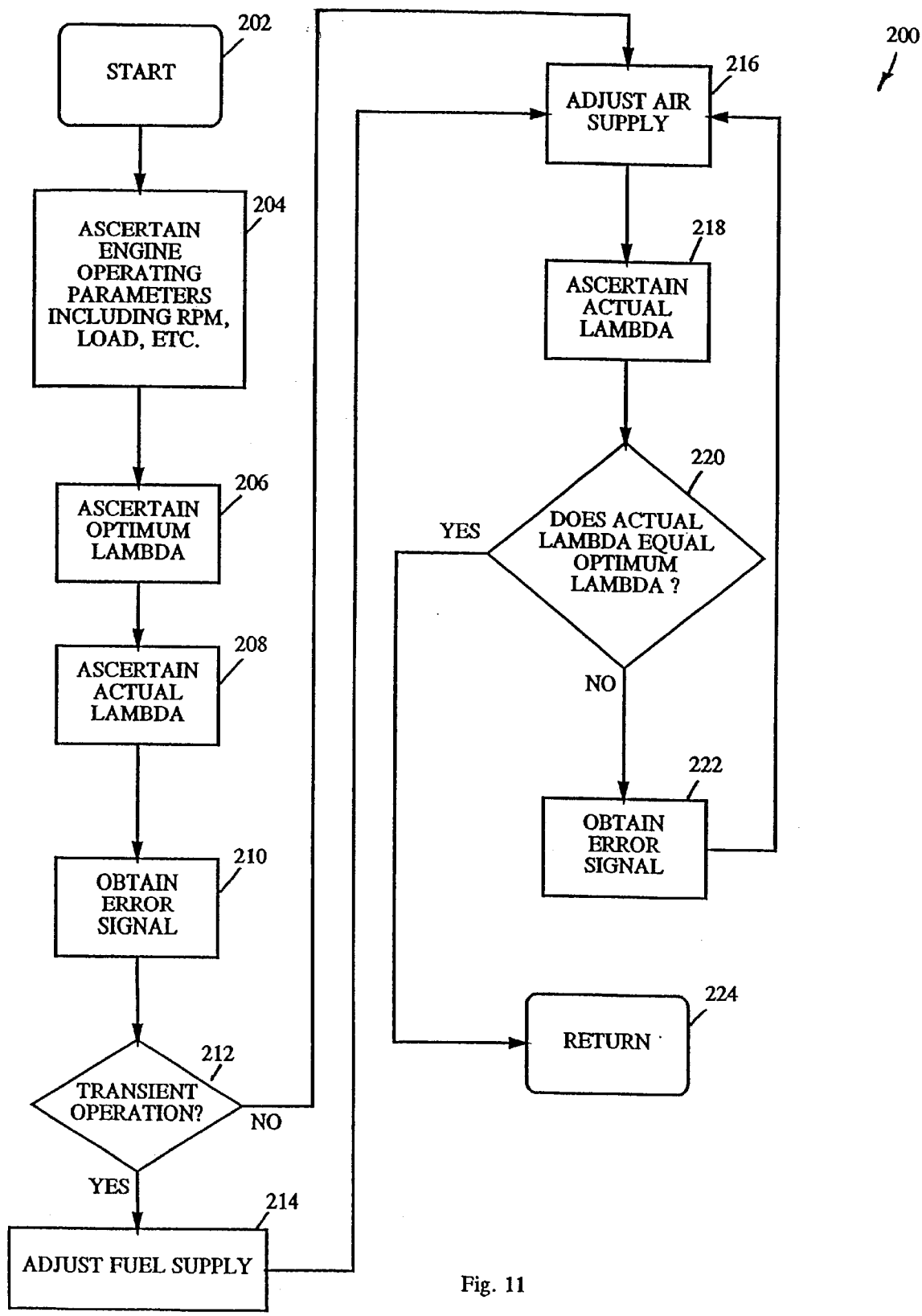
FIG. 11 is a flow chart of a closed loop, full range, and full time control scheme for the optimization of lambda in accordance with the invention.
Figure 13A:
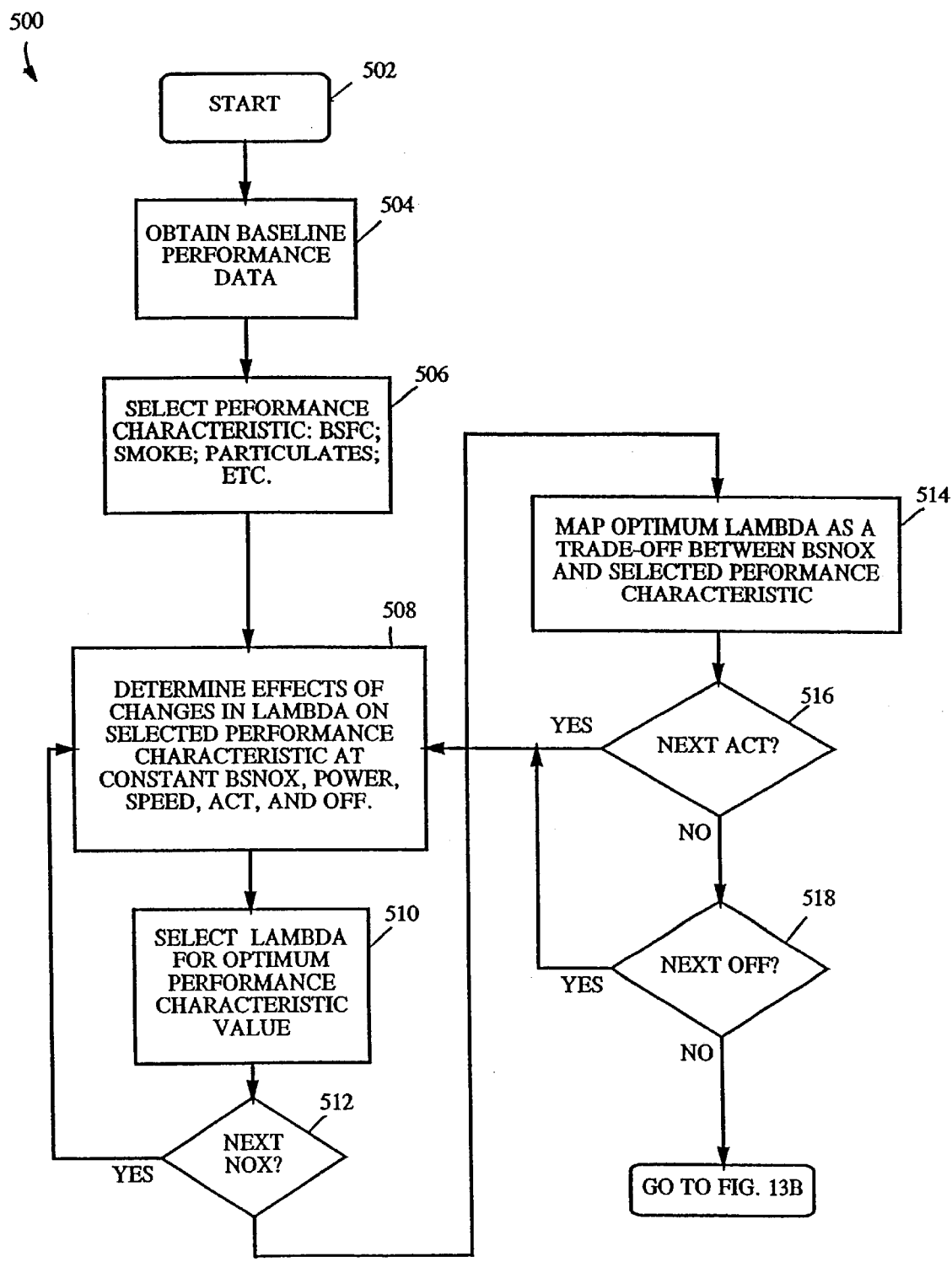
FIGS. 13A–13C collectively form a flow chart of a scheme for determining optimum lambda, ACT, and skipped cylinders in accordance with the invention.
Figure 13B:
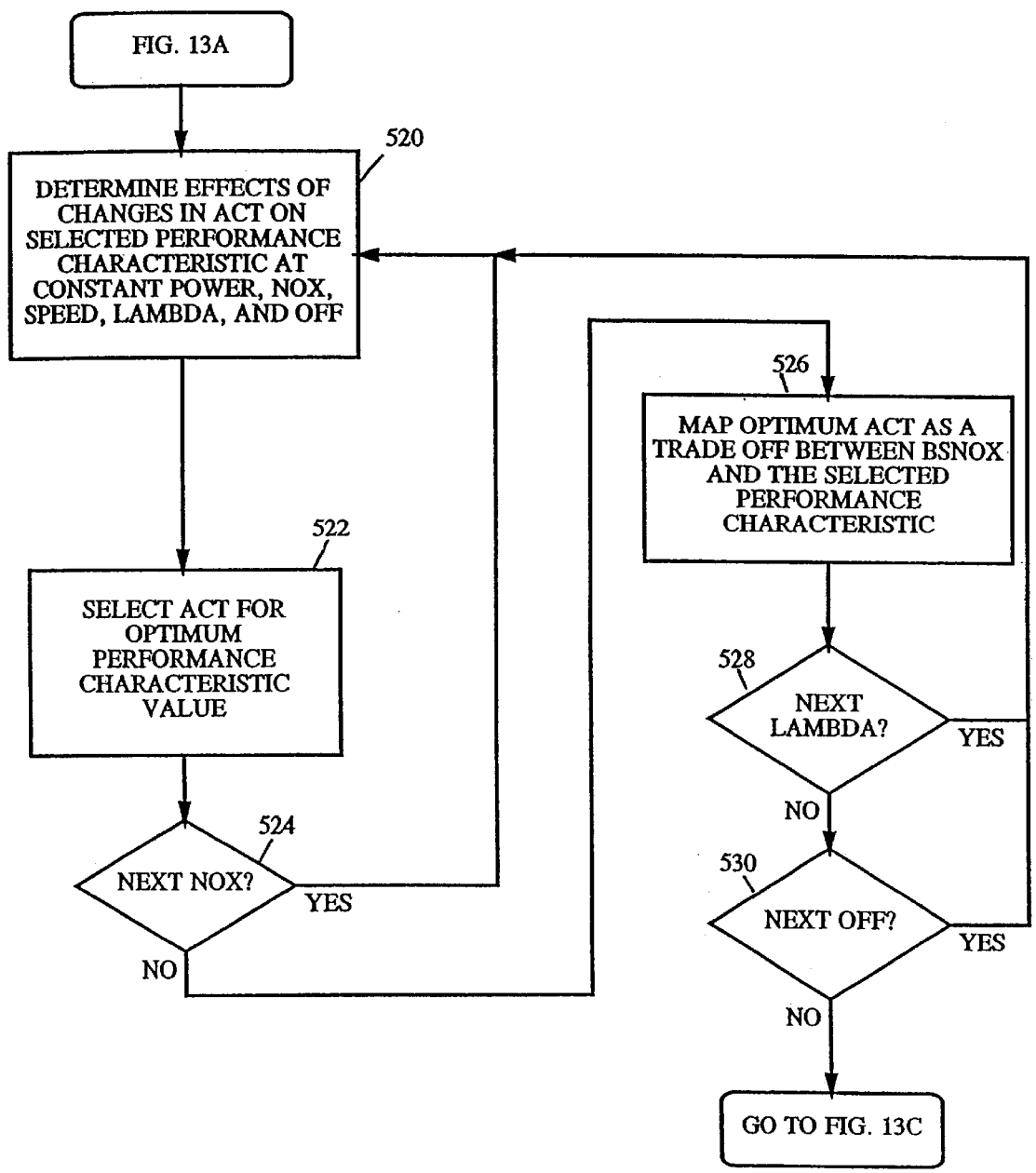
Figure 13C:
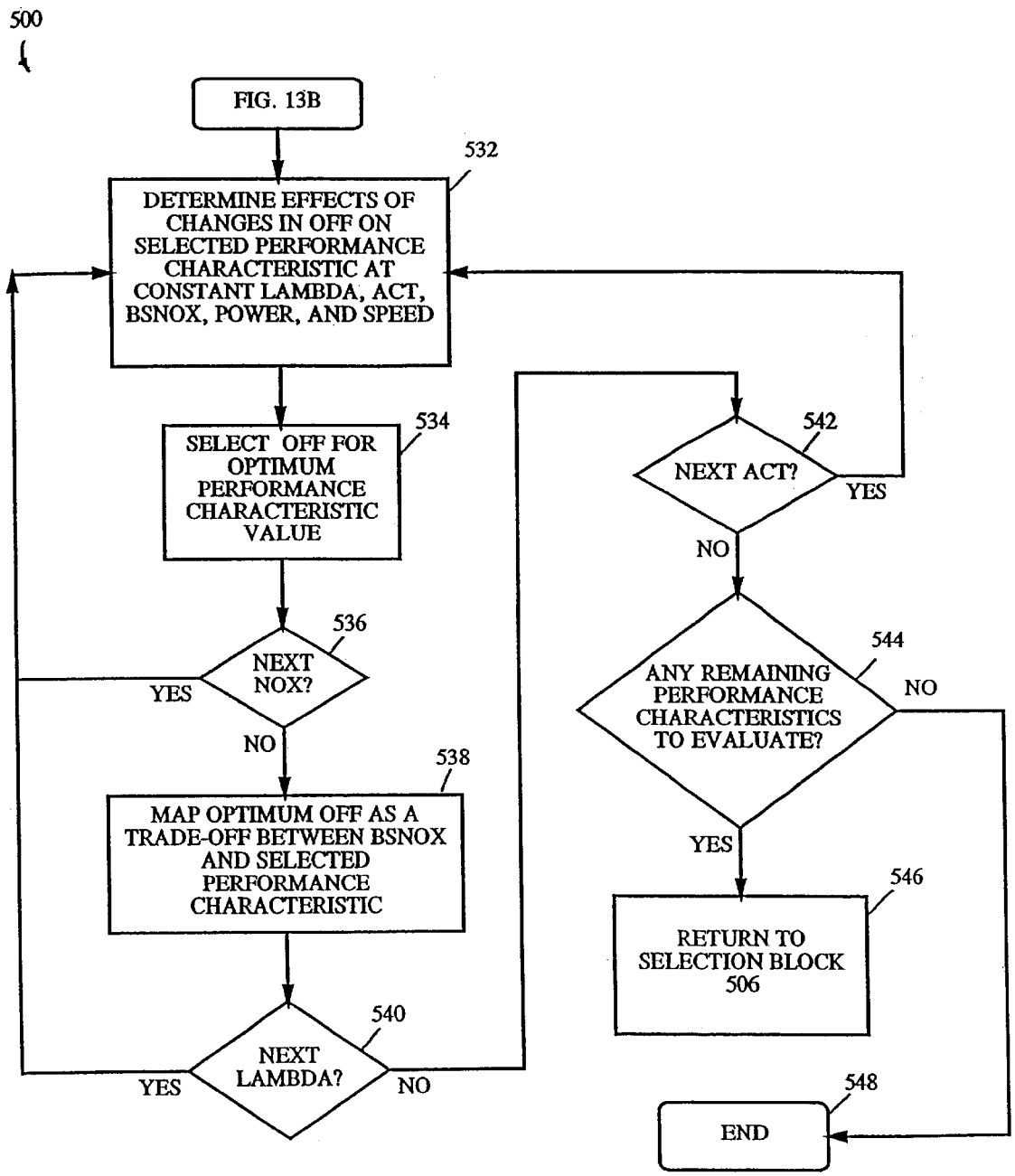

Referring to FIG. 11, a routine 200 preprogrammed in the ECU 150 for these purposes proceeds from start in block 202 to block 204 where current engine operating conditions are ascertained using signals from the sensors 152–172. These operating conditions will include engine speed, engine load, lambda, ACT, the number of cylinders firing, etc. The optimum lambda ($\lambda_{OPT}$) for the prevailing engine operating conditions then will be ascertained in step 206, preferably by reading $\lambda_{OPT}$ from a map stored in the memory of the ECU 150. This map typically will store the value of $\lambda_{OPT}$ at a particular engine speed/load condition. The optimum value of lambda will vary from application to application, depending upon the engine performance characteristics sought to be optimized. Typically, and for the purposes of the present example, $\lambda_{OPT}$ can be considered to be that which strikes the ideal balance between emissions and fuel economy at prevailing rpm, load, ACT, and skip fire conditions. This "ideal balance" may vary depending upon whether the designer is primarily concerned with maximizing fuel economy or with minimizing emissions. The manner in which this map may be generated for a particular engine will be detailed in Section 5 below in conjunction with the discussion of FIGS. 13A–13C.

Next, in step 208, the ECU 150 ascertains the actual value of lambda ($\lambda_{ACT}$), either directly or indirectly, in a manner which is well known to those skilled in the art, using as input data 1) signals from the sensor 170 and 2) the commanded fuel flow. A substraction of $\lambda_{OPT}$ minus $\lambda_{ACT}$ in block 210 yields an error signal ERR.

A very high ERR will indicate transient engine operation (sudden and sharp increase or decrease in commanded power) that will hinder or even preclude lambda optimization by air charge modulation alone. In order to take this possibility to account, the routine 200 inquires in step 212 whether or not the engine 50 is undergoing transient operation. If so, the ECU 150 will adjust the operation of the fuel injector 74 and/or the rail pressure regulator 86 in block 214 to temporarily reduce or increase the fuel quantity with respect to the commanded quantity by an amount required to attain lambda optimization at the prevailing air charge pressure value. The duration and magnitude of this fuel supply adjustment will vary with the severity of the transient condition and the response time of the air charge control system. Fuel supply adjustment will terminate as soon as the system is capable of optimizing lambda by air supply control alone.

The routine 200 then proceeds to block 216 for air supply adjustment. This adjustment preferably will include at least adjustment of the position of the supercharger control valve 112 and may, depending upon the results sought and the preferences of the programmer, also include adjustment of other parameters of the intake air supply system. The magnitude of adjustment preferably is set to be proportional to the magnitude of the error signal ERR in order to minimize the number of iterations required for lambda optimization. If the error signal ERR is positive, indicating that lambda needs to increase, the ECU 150 preferably will control the air supply system to increase MAP by 1) increasing airflow through the intercooler control valve 136, 2) decreasing or cutting-off airflow through the intercooler bypass valve 134 and the TAB valve 100, and 3) modulating the supercharger control valve 112 to increase the supercharging effect on the inlet air flowing into the turbocharger 90. Conversely, if it is decided in block 210 that the signal ERR is negative and that lambda therefore needs to be decreased, the ECU 150 preferably will control the air supply system to decrease MAP by 1) decreasing or cutting off airflow through the intercooler control valve 136, 2) increasing or permitting airflow through the intercooler bypass valve 134 and the TAB valve 100, and 3) modulating the supercharger control valve 112 to decrease the supercharging effect on the inlet air flowing into the turbocharger 90.

Next, in block 218, the value of actual lambda $\lambda_{ACT}$ is again ascertained, and that actual value is once again compared to the optimum value $\lambda_{OPT}$ in block 220 to determine whether or not $\lambda_{ACT}$ is approximately equal to $\lambda_{OPT}$. If not, the error signal ERR is once again obtained in block 222, and the routine 200 returns to block 216 where the air supply is once again adjusted with the magnitude of adjustment once again being proportional to the magnitude of the error signal. The routine 200 then proceeds through blocks 216, 218, 220, and 222 in a reiterative, closed loop fashion until $\lambda_{ACT}$ is approximately equal to $\lambda_{OPT}$, at which point the routine 200 proceeds to return in a block 224.

Figure 8:
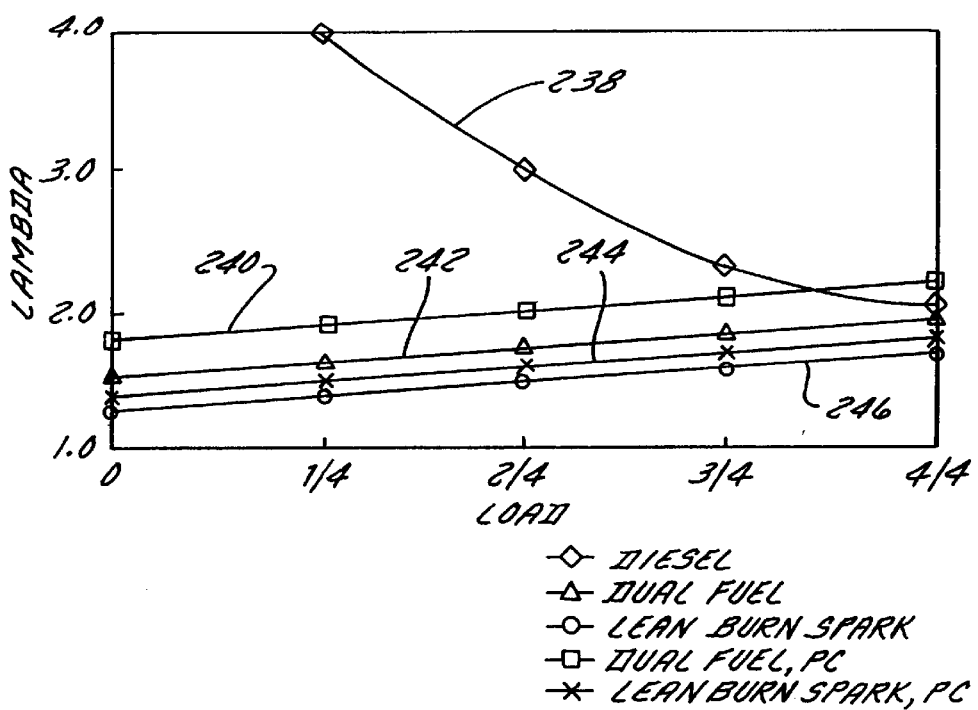
FIG. 8 is a graph of optimum lambda versus engine load for various engines.
Figure 9:
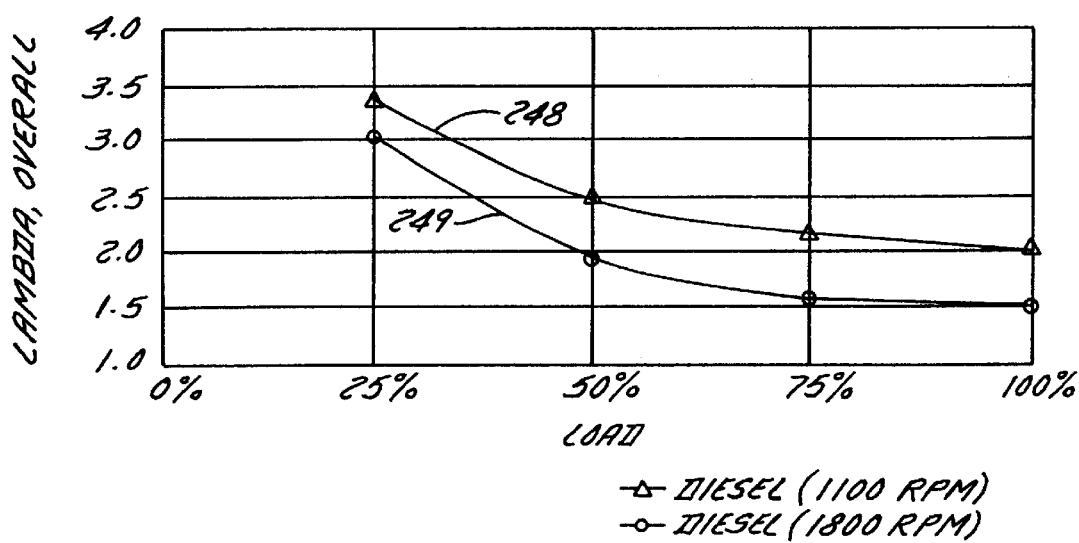
FIG. 9 is a graph of optimum lambda versus engine load at various engine speed settings.

The above-described closed-loop process is repeated, on a cylinder by cylinder and cycle by cycle basis, preferably whenever the engine 50 is operating, throughout the speed and load ranges of the engine 50. This full time and full range control achieves steady-state lambda optimization that heretofore would not have been achieved. The effects of the failure of traditional systems—even those that seek to increase lambda during engine operation—to obtain full time and full range lambda optimization can be appreciated with reference to FIGS. 7–9.

Figure 7:
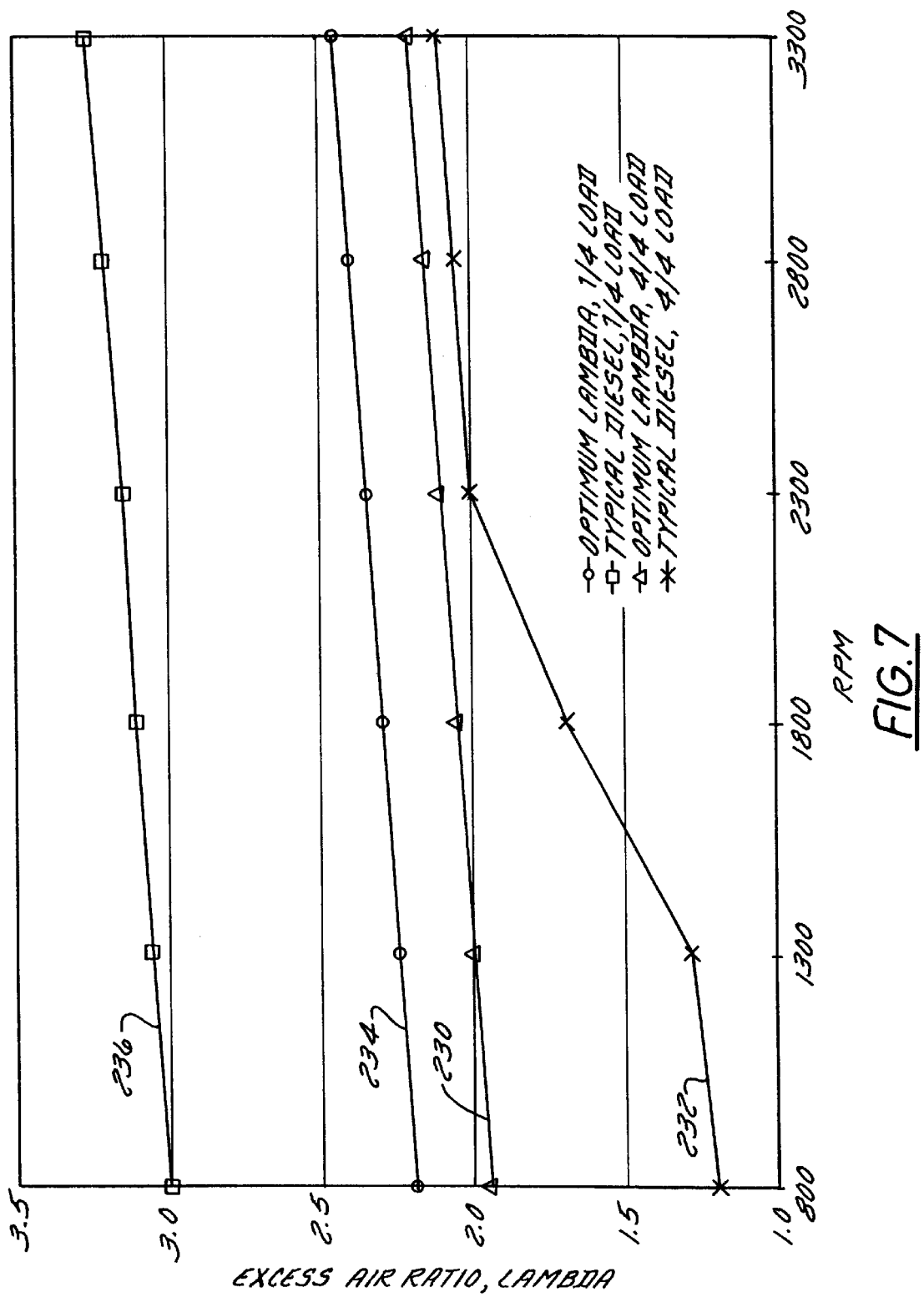
FIG. 7 is a graph of optimum lambda versus rpm at various engine load settings.

For instance, a comparison of the curve 230 to the curve 232 in FIG. 7 indicates that, at full load, the typical diesel engine operating at a steady lambda consistently achieves a less than optimal lambda. This discrepancy is particularly high at low engine speed and remains high up to approximately 2,300 rpm. On the other hand, a comparison of curve 234 to the curve 236 in FIG. 7 indicates that, at ¼ load (a typical light load condition), actual lambda is consistently and significantly higher than typical lambda in a typical diesel engine. The reasons for these discrepancies can be understood with reference to FIGS. 8 and 9. Curve 238 in FIG. 8 indicates that, in a diesel engine, optimum lambda at rated engine speed varies somewhat dramatically from a maximum value of about 4.0 at ¼ load or less to a minimum value of less than 2.0 at full load. A comparison of this curve to curves 240, 242, and 244 indicate that this variation is typically much greater than that required by gas-fueled engines and even by dual fuel or compression ignited gas fueled engines. This variation of lambda with engine load at a particular speed is confirmed by the curves 248 and 249 in FIG. 9 which illustrate that lambda in a conventional (non-optimized) diesel engine lambda tends to increase with increased engine speed and decreased load.

4. Compression Temperature Modulation

As discussed above, modulating the air charge temperature (ACT) results in a modification of lambda. Modulating ACT also necessarily modulates compression temperature, i.e., the effective temperature within the cylinder at the time of fuel injection. It has been discovered that, just as an engine operating under a particular load and speed condition exhibits an optimum lambda, it also exhibits an optimum compression temperature because the ignition characteristics of a compression ignition engine are strongly influenced by the compressed air temperature at the time of fuel injection. It then becomes both possible and prudent to determine and control the optimum values of both lambda and ACT and to modulate engine operation to achieve and maintain these values.

The effects of compression temperature modulation can be appreciated from a realization that the ignition delay period of conventional diesel fuel (Tid) is inversely proportional to the fifth power of the absolute temperature of the compression temperature as indicated by the following equation:

$$Tid = 4C/Patm(1000/T)^5 \qquad \text{EQ. 1}$$

where:
  Tid is ignition delay in milliseconds
  T is absolute temperature deg K
  C is a correction coefficient that allows compensation for other factors such as cetane No. that can affect the absolute value of ignition delay time; and
  Patm is the compression pressure in atmospheres.

Equation (1) is only an approximation and will be affected by other variables such as fuel temperature and cetane No. However, the effect on ignition delay will remain as an inverse function of about the fifth power of temperature.

The absolute temperature of compression (Tc) in turn is nearly linearly proportional to ACT as approximated by the following equation:

$$i\ Tc = (ACT)(CR)^{(n-1)} \qquad \text{EQ. 2}$$

where:

CR is the engine's compression ratio; and n is approximately 1.34 for a typical diesel engine.

For example, at an ACT of 300 K and a compression ratio of 18:1, the calculated compression temperature is:

$$Tc=300(18^{\wedge}0.34)=801 \text{ K} \qquad \text{EQ. 3}$$

For this temperature and a peak pressure of 48 bar and C=1.0, the calculated ignition delay period is approximately 0.25 milliseconds.

By increasing the ACT to 350 K (an increase of only 50 K), the ignition delay period will be reduced from 0.25 milliseconds or 3.0 degrees crank angle to approximately 0.11 milliseconds, or 1.3 degrees crank angle at 1800 rpm. Since the resultant time interval is very short, the normal adverse effects caused by pre-mixed combustion usually become negligible, thus minimizing the need for pilot or split injection, and thereby reducing duration of injection, burn time, fuel consumption and smoke emissions. ACT control therefore is highly desirable.

ACT can be adjusted by various techniques, but the preferred embodiment is to modulate the input power to the series supercharger 92 (by modulation of the supercharger power control valve 112) followed by modulation of the TAB valve 100 and modulation of the intercooler bypass and control valves 134 and 136. ACT can be raised by 1) increasing compressor output temperature by closing the supercharger control valve 112, 2) bypassing the intercooler 130 and any aftercooler heat exchanger, e.g, by opening the valve 134 and closing the valve 136 and 3) delaying intake valve opening to increase the effective compression temperature. ACT can be further increased and MAP decreased by bypassing and recirculating air directly from the compression outlets to the compression inlets of the supercharger 92 and turbocharger 90. It is noteworthy that the recirculation of air from the supercharger outlet line 106 to the supercharger inlet or air inlet line 96 can be used to increase ACT to aid starting and idle under conditions of cold ambient temperatures. ACT can be lowered to a temperature at or near the ambient air temperature by 1) decreasing compressor output pressure by opening the supercharger control valve 112 and 2) increasing intercooling by closing the valve 134 and opening the valve 136.

In some cases, engine performance can be further enhanced by reduction of ACT below ambient air temperature. Such additional reduction can be accomplished through the early closing of the camless controllable intake valves 62 (also known as the "Miller" cycle) which reduces the effective compression ratio and thereby reduces the effective ACT since the end result is a reduction in compression temperature and lower $NO_x$ emissions. Early (or late) closing of the intake valves reduces the effective compression ratio and therefore has the same effect on compression temperature as a reduction in ACT.

The camless, controllable intake and exhaust valves 62 and 64 can be used to obtain benefits other than ACT control. For instance, at light load, the ECU 150 can control the valves 62 and 64 to remain closed for selected cycles to effect skip fire with both fuel and air. This skip fire will increase the ACT control range and enhance engine performance. During optimized skip fire control, the optimum firing fraction (OFF) (i.e., the optimum fraction of cylinders firing in a given firing cycle) is selected to achieve the desired effect under the prevailing engine operating conditions. Like $\lambda_{OPT}$ and $ACT_{OPT}$, $OFF_{OPT}$ at particular engine operating parameters preferably is stored in the ECU as a map. An exemplary procedure for deriving this map is detailed in Section 5 below.

Figure 10:
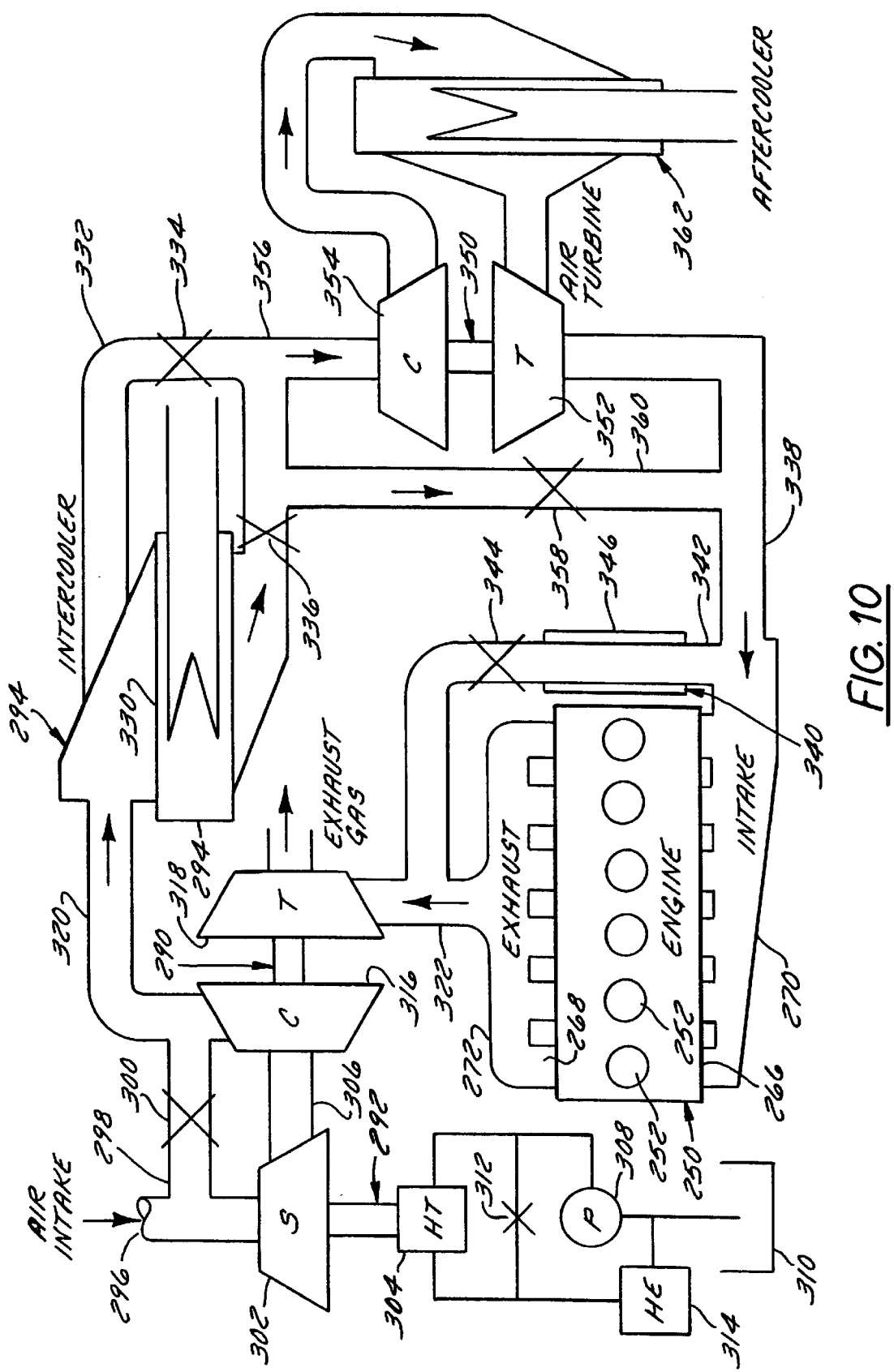
FIG. 10 is a schematic representation of the air supply system of a diesel engine constructed in accordance with a second preferred embodiment of the invention.

The description thus far presented assumes that the intake and exhaust valves 62 and 64 are electronically operated, camless valves. These electronically controlled valves might not be available on some engines. However, at least one of their desired effects, i.e., reduction in ACT to below ambient temperature, can be achieved by use of a turboexpander. An engine 250 having a turboexpander for these purposes is illustrated in FIG. 10. Engine 250 differs from the engine 50 of FIGS. 4–6 only in that 1) its intake and exhaust valves (not shown) are conventional, cam-operated valves and 2) it includes a turboexpander 350. Components of the engine 250 of FIG. 10 corresponding to components of the engine 50 of FIGS. 4–6 are designated by the same reference numerals, incremented by 200.

The engine 250 includes a plurality of cylinders 252. The cylinders 252 are supplied with air via an air supply control system and fuel via a fuel supply system. The fuel supply system is identical to that illustrated in FIG. 4 and discussed above. The air supply system includes a turbocharger 290, a series supercharger 292, an intercooler assembly 294, and a turboexpander 350. The supercharger 292 includes a compressor 302, a turbine 304, a pump 308, a reservoir 310, a supercharger control valve 312, and an oil cooler 314. The turbocharger 290 includes a compressor 316 and a turbine 318. A TAB valve 300 permits partial or complete turbocharger bypass. The intercooler assembly 294 includes an intercooler 330, an intercooler control valve 336, and an intercooler bypass valve 334 located in a bypass line 332. An EGR subassembly 340 (if present) includes an EGR line 342 in which is disposed an EGR valve 344 and an EGR cooler assembly 346.

The turboexpander 350 is located in the air supply system so as to selectively cool intake air to below ambient temperature prior to its induction into the intake manifold 270. The turboexpander 350 preferably is located downstream of the intercooler 330 so as to act on the lowest-available temperature air. The turboexpander 350 includes 1) an expansion turbine 352 located in a branch line 356 of the air intake line system and 2) an air compressor, hydraulic pump, or other energy absorbing device 354 connected to the turbine 352. Air flowing through the turbine 352 transfers energy in the form of heat to the turbine and thereby is cooled. This heat then is absorbed by the turbo compressor 354 or other energy absorption device. The cooling effect of the turbine 352 can be modulated through the control of a turboexpander control valve 358 located in a line 360 that bypasses the turbine 352. This valve 358 is a variable-orifice, electronically actuated valve controllable by the ECU 150 so as to vary the cooling effect of the turboexpander 350 from 0 to a maximum depending upon the closing degree of the valve 358. A more elegant and more efficient alternative is to use a variable area nozzle on the turboexpander turbine 352 to replace the turboexpander control valve 358.

ACT can also be reduced to below ambient temperature using a device such as an aftercooler 362 in combination with the turboexpander 350. The illustrated aftercooler 362 is disposed in a line 364 leading from the outlet of the turboexpander compressor 354 to the inlet of the turboexpander turbine 352. The cooling effect of the aftercooler can be modulated by modulating the fraction of total turboexpander airflow that flows through the aftercooler 362.

Figure 12:
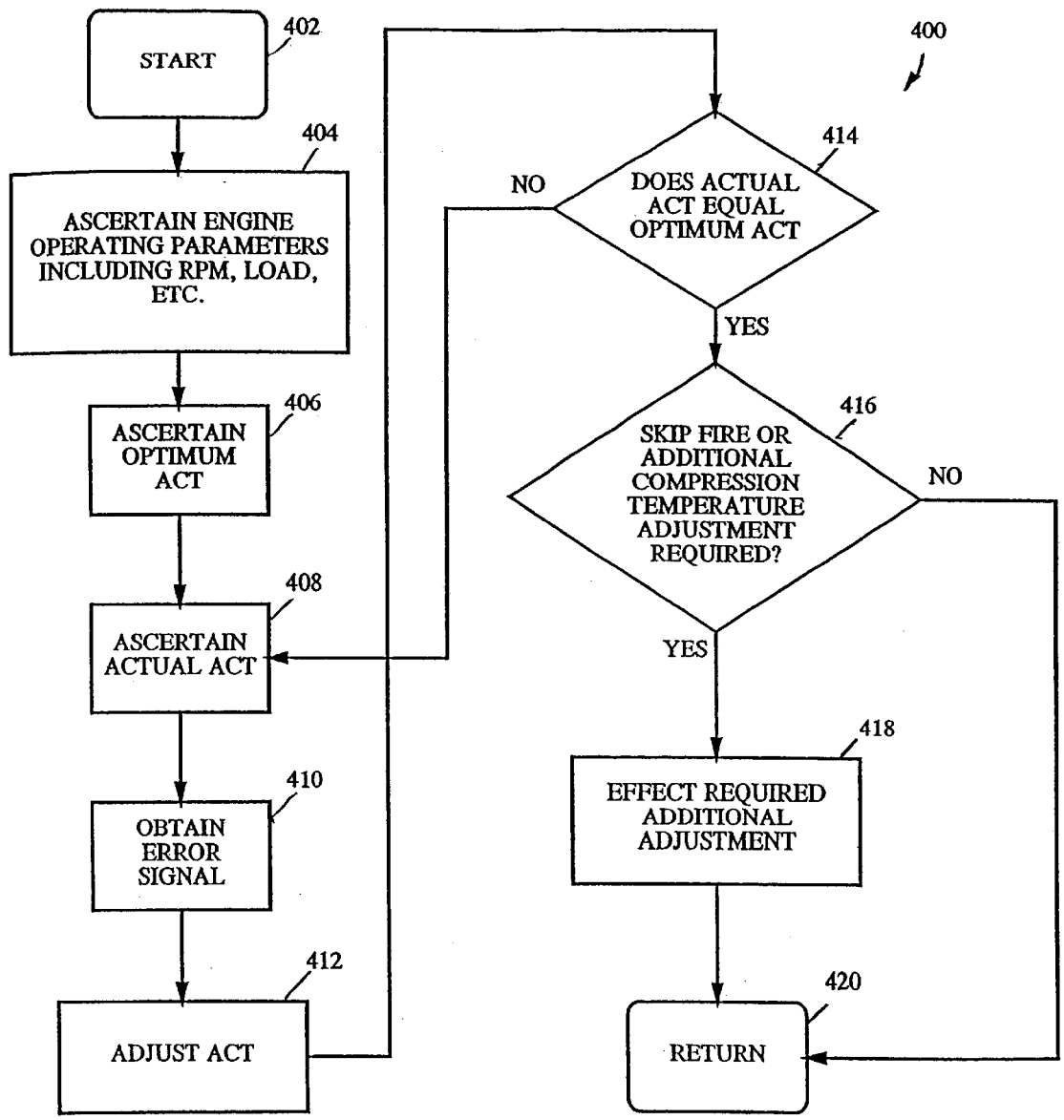
FIG. 12 is a flow chart of a closed loop, full range, and full time control scheme for the optimization of ACT in accordance with the invention.

Referring now to FIG. 12, a routine 400 is illustrated for optimizing compression temperature through ACT adjustment on a cylinder by cylinder and cycle by cycle basis. The routine 400 is described in conjunction with the engine 250 of the second embodiment and the accompanying turboexpander control, it being understood that the same or similar routine is equally applicable to the engine 50 of the first embodiment and the accompanying intake and exhaust valve control. The routine 400 proceeds from start at block 402 to block 404 in which engine operating parameters including RPM, load, lambda, etc., are ascertained using, for example, input from the speed sensor 156, power demand sensor 152, lambda sensor 170, and other sensors in FIG. 6. Next, in block 406, an optimum ACT is ascertained for the prevailing engine operating conditions. As with lambda, the optimum ACT may vary from application to application depending upon the engine performance characteristic to be optimized. For instance, Equation 2 above could be solved for ACT to obtain a compression temperature which reduces ignition delay period and consequent premixed burning by an optimum amount. This optimal ACT value could also be modified to take into account prior or simultaneous lambda control. In the illustrated and preferred embodiment, ACT is optimized in conjunction with lambda optimization and skip fire to strike a desired balance between fuel economy and emissions. Optimal values of ACT at prevailing engine operating conditions are stored in a map that is located in the memory of the ECU 150 and that is generated using the routine 500 discussed in Section 5 below.

Next, the actual ACT ($ACT_{ACTUAL}$) is ascertained in block 408, preferably using a signal generated by the ACT sensor 162. The signal $ACT_{ACTUAL}$ is subtracted from the signal $ACT_{OPT}$ in block 410 to obtain an error signal $ERR_{ACT}$. Engine operation then is adjusted in block 412 to modulate ACT at a magnitude which is proportionate to the magnitude of the signal $ERR_{ACT}$. The adjustment procedure chosen will vary depending on whether or not the signal $ERR_{ACT}$ is positive or negative. If the signal $ERR_{ACT}$ is positive, thus indicating that $ACT_{OPT}$ is greater than $ACT_{ACTUAL}$ and that the ACT therefore needs to be increased, ECU 150 will close the TAB valve 300 to of the turbocharger 290 while closing the intercooler control valve 336 and opening the intercooler bypass valve 334 to eliminate or partially eliminate intercooling. The supercharger control valve 312 then is partially or fully closed and the compressor bypass valve (TAB) valve 300 is opened by an amount designed to increase the output temperature of the supercharger 292 in proportion to the magnitude of the error signal $ERR_{ACT}$.

If, on the other hand, the signal $ERR_{ACT}$ is negative, indicating that $ACT_{ACTUAL}$ is greater than $ACT_{OPT}$ and that $ACT_{ACTUAL}$ therefore needs to be decreased, the TAB valve 300 is controlled to increase MAP, and valves 334, 336, and 358 are adjusted to reduce ACT by intercooling and/or turboexpansion enhancement. If cooling of ACT to a temperature below ambient temperature is required, the additional cooling effect of the turboexpander 350 can also be utilized through the closing or partial closing of the turboexpander control valve 358 and TAB valve 300.

Next, in block 414, the ECU 150 again inquires whether or not $ACT_{ACTUAL}$ equals $ACT_{OPT}$. If not, the procedures of blocks 408, 410, 412, and 414, are repeated in a closed loop routine until ACT is optimized for the prevailing engine operating conditions. Then, in step 416, an inquiry is made as to whether or not skip fire or other adjustment that is not necessarily related to optimal ACT is required. If not, the routine 400 proceeds directly to the return block 420. If so, the routine 400 effects the required additional adjustment in block 418 before proceeding to the return block 420.

The routine 400 does not detect transient operation and accordingly, does not react to it. However, transient operation easily could be detected and accounted for if desired using the same strategy discussed in conjunction with FIG. 11 above.

As with lambda control, the above process is repeated continuously on a full time, full range basis for each cylinder so that ACT remains optimized whenever the engine is operating. This control scheme represents a marked departure from standard diesel engine control schemes which typically operate at higher than optimal ACT at high load and lower than optimal ACT at light load.

5. Determination of Optimal Lambda, ACT, and OFF

The optimum values of lambda, ACT, OFF and possibly other engine operating parameters to be controlled pursuant to the invention could be determined mathematically based upon theoretical engine operation. For instance, a possible mathematical determination of ACT is discussed in Section 4 above, and a mathematical determination of OFF for a gaseous fueled engine is discussed in some detail in the Beck '575 patent described above. However, since there are numerous parameters which are affected by the adjustment of lambda and ACT, the selection of lambda, ACT, OFF, and other values for true performance optimization can be a complex procedure. However, if certain parameters are held constant while adjusting inlet temperature and inlet pressure separately, a simplified alternative optimization procedure can be established. One such procedure, implementable by the ECU 150 as a routine 500, will now be summarized with reference to FIGS. 13A–13C.

First, the routine 500 proceeds from start in block 502 to block 504 where signals from sensors 152–172 are used to obtain baseline performance data that obtains the best available trade-off between $NO_x$ emissions, fuel economy, smoke, and power, using conventional procedures without full time control of lambda, ACT, or OFF. Next, in block 506, a performance characteristic to be initially optimized is selected. In the illustrated embodiment, the first such performance characteristic to be optimized is brake specific fuel consumption (BSFC). Then, in block 508, lambda is varied (by control of the TAB valve 100 or 300, supercharger control valve 112, or 312, and/or intercooler valves 134, 136, 334, 336) while $BSNO_x$, power, ACT, OFF, and speed are held constant. The effects of that lambda variation on the selected performance characteristic (BSFC) then is evaluated (using data from selected ones of the sensors 160–172) so that a lambda is selected in block 510 for the optimum performance characteristic value under the prevailing $BSNO_x$, power, and speed conditions. As discussed above, this "optimum" value will vary with, among other things, the selected weighted importance of fuel economy versus emissions. An inquiry block 512 then is utilized to repeat the blocks 508 and 510 for the full range of $NO_x$, at the prevailing speed, load, and OFF conditions so that a map of optimum BSFC is obtained through the full-range of speed, load and $NO_x$. A map of optimum lambda as a trade-off between $BSNO_x$ and the selected performance characteristic (BSFC in the first iteration) can then be obtained and stored in block 514. Typical maps generated at an intermediate point in the mapping process for a gas engine and a diesel engine are reproduced as Table 1 and Table 2, respectively. Each map represents optimum lambda for a full range of engine speed conditions. Additional maps would be generated over the operating ranges of load, ACT, etc.

TABLE 1

Optimum Lambda MAP - Natural Gas
Engine RPM

| Fuel mm³/inj | 700 | 1000 | 1200 | 1400 | 1600 | 1800 | 2000 | 2200 | 2400 | 2600 |
|---|---|---|---|---|---|---|---|---|---|---|
| 0 | 1.75 | 1.75 | 1.75 | 1.75 | 1.75 | 1.75 | 1.75 | 1.75 | 1.75 | 1.75 |
| 10 | 1.75 | 1.75 | 1.75 | 1.75 | 1.75 | 1.75 | 1.75 | 1.75 | 1.75 | 1.75 |
| 20 | 1.80 | 1.80 | 1.80 | 1.80 | 1.80 | 1.80 | 1.80 | 1.80 | 1.80 | 1.80 |
| 30 | 1.85 | 1.85 | 1.85 | 1.85 | 1.85 | 1.85 | 1.85 | 1.85 | 1.85 | 1.85 |
| 40 | 1.85 | 1.85 | 1.85 | 1.85 | 1.85 | 1.85 | 1.85 | 1.85 | 1.85 | 1.85 |
| 60 | 1.85 | 1.85 | 1.85 | 1.85 | 1.85 | 1.85 | 1.85 | 1.85 | 1.85 | 1.85 |
| 80 | 1.85 | 1.85 | 1.85 | 1.85 | 1.85 | 1.85 | 1.85 | 1.85 | 1.85 | 1.85 |
| 100 | 1.85 | 1.85 | 1.85 | 1.85 | 1.85 | 1.85 | 1.85 | 1.85 | 1.85 | 1.85 |
| 120 | 1.85 | 1.85 | 1.85 | 1.85 | 1.85 | 1.85 | 1.85 | 1.85 | 1.85 | 1.85 |
| 140 | 1.85 | 1.85 | 1.85 | 1.85 | 1.85 | 1.85 | 1.85 | 1.85 | 1.85 | 1.85 |

TABLE 2

Optimum Lambda MAP - Diesel
Engine RPM

| Fuel mm³/inj | 700 | 1000 | 1200 | 1400 | 1600 | 1800 | 2000 | 2200 | 2400 | 2600 |
|---|---|---|---|---|---|---|---|---|---|---|
| 0 | 3.00 | 3.00 | 3.00 | 3.00 | 3.00 | 3.00 | 3.00 | 3.00 | 3.00 | 3.00 |
| 10 | 2.50 | 2.50 | 2.50 | 2.50 | 2.50 | 2.50 | 2.50 | 2.50 | 2.50 | 2.50 |
| 20 | 2.40 | 2.40 | 2.40 | 2.40 | 2.40 | 2.40 | 2.40 | 2.40 | 2.40 | 2.40 |
| 30 | 2.35 | 2.35 | 2.35 | 2.35 | 2.35 | 2.35 | 2.35 | 2.35 | 2.35 | 2.35 |
| 40 | 2.30 | 2.30 | 2.30 | 2.30 | 2.30 | 2.30 | 2.30 | 2.30 | 2.30 | 2.30 |
| 60 | 2.25 | 2.25 | 2.25 | 2.25 | 2.25 | 2.25 | 2.25 | 2.25 | 2.25 | 2.25 |
| 80 | 2.20 | 2.20 | 2.20 | 2.20 | 2.20 | 2.20 | 2.20 | 2.20 | 2.20 | 2.20 |
| 100 | 2.15 | 2.15 | 2.15 | 2.15 | 2.15 | 2.15 | 2.15 | 2.15 | 2.15 | 2.15 |
| 120 | 2.10 | 2.10 | 2.10 | 2.10 | 2.10 | 2.10 | 2.10 | 2.10 | 2.10 | 2.10 |
| 140 | 2.10 | 2.10 | 2.10 | 2.10 | 2.10 | 2.10 | 2.10 | 2.10 | 2.10 | 2.10 |

Blocks 508 through 514 then are repeated (under the control of inquiry blocks 516 and 518) to repeat the calibration procedures for the full range of ACT and OFF. Maps of optimum lambda for a full range of speed, load, $NO_x$, ACT, and OFF conditions thereby is generated.

Next, optimum values of ACT for the selected performance characteristic (BSFC in the first iteration) is determined. This determination begins with block 520 where the routine 500 determines the effects of changes in ACT on the selected performance characteristic at constant values of lambda, OFF, power, and speed. The ACT which optimizes that performance characteristic under those conditions then is selected in block 522. An inquiry block 524 then causes the blocks 520 and 522 to be repeated for a full ranges of $NO_x$. The optimum ACT as a trade-off between $BSNO_x$ and the selected performance characteristic at the prevailing values of lambda, OFF, speed, and load then is mapped in block 526. A typical map generated at an intermediate point in the mapping process for a diesel engine is reproduced as Table 3. This map represents optimum ACT for a full range of engine speed conditions. Additional maps would be generated over the operating ranges of load, lambda, etc.

TABLE 3

Optimum ACT (Deg F) MAP, Diesel
Engine RPM

| Fuel mm³/inj | 700 | 1000 | 1200 | 1400 | 1600 | 1800 | 2000 | 2200 | 2400 | 2600 |
|---|---|---|---|---|---|---|---|---|---|---|
| 0 | 160 | 155 | 150 | 145 | 140 | 135 | 130 | 130 | 125 | 120 |
| 10 | 150 | 145 | 140 | 140 | 135 | 130 | 120 | 120 | 120 | 115 |
| 20 | 150 | 145 | 135 | 130 | 125 | 120 | 110 | 110 | 110 | 110 |
| 30 | 140 | 135 | 125 | 120 | 115 | 110 | 110 | 110 | 105 | 105 |
| 40 | 130 | 125 | 115 | 110 | 105 | 100 | 90 | 85 | 85 | 90 |
| 60 | 120 | 115 | 105 | 100 | 95 | 90 | 80 | 80 | 80 | 80 |
| 80 | 110 | 105 | 95 | 90 | 85 | 80 | 70 | 70 | 70 | 70 |
| 100 | 100 | 90 | 85 | 80 | 75 | 70 | 60 | 60 | 60 | 50 |
| 120 | 85 | 80 | 75 | 70 | 65 | 60 | 60 | 60 | 60 | 60 |
| 140 | 75 | 70 | 65 | 60 | 55 | 50 | 50 | 50 | 50 | 50 |

Blocks 520 through 526 then are repeated (under the control of inquiry blocks 528 and 530) for the full range of lambda and OFF. Maps of optimum ACT for a full range of speed, load, $NO_x$, lambda, and OFF conditions thereby is generated.

The routine 500 then proceeds to block 532 to determine the effects of changes in OFF on the selected performance characteristic (BSFC in the first iteration) at constant lambda, ACT, BSNO$_x$, power, and speed. The optimum OFF for that performance characteristic then is selected in block 534, and an inquiry block 536 causes the blocks 532 and 534 to be repeated until a map of the trade-off between BSNO$_x$ and the selected performance characteristics at the constant values of lambda, ACT, power, and speed is stored in block 538. Blocks 532 through 538 are repeated (under control of inquiry blocks 540 and 542) for the full range of lambda and ACT. A map of optimum OFF for a full range of speed, load, NO$_x$, lambda, and ACT conditions thereby is generated.

Next, in block 544, the routine 500 determines whether or not any remaining performance characteristics such as smoke, particulates, etc. need to be evaluated. If not, i.e., if all performance characteristics to be taken into account have been evaluated, the routine 500 ends in block 548. If so, the routine 500 returns to block 506 under control of the block 546, and optimum values of lambda, ACT, and OFF are mapped for those performance characteristics.

The above-described mapping procedure could performed manually under steady state operation or by a computer controlled mapping routine of the type known to those skilled in the art.

6. Use of Three-Spool Supercharger for ACT Control

Figure 14:
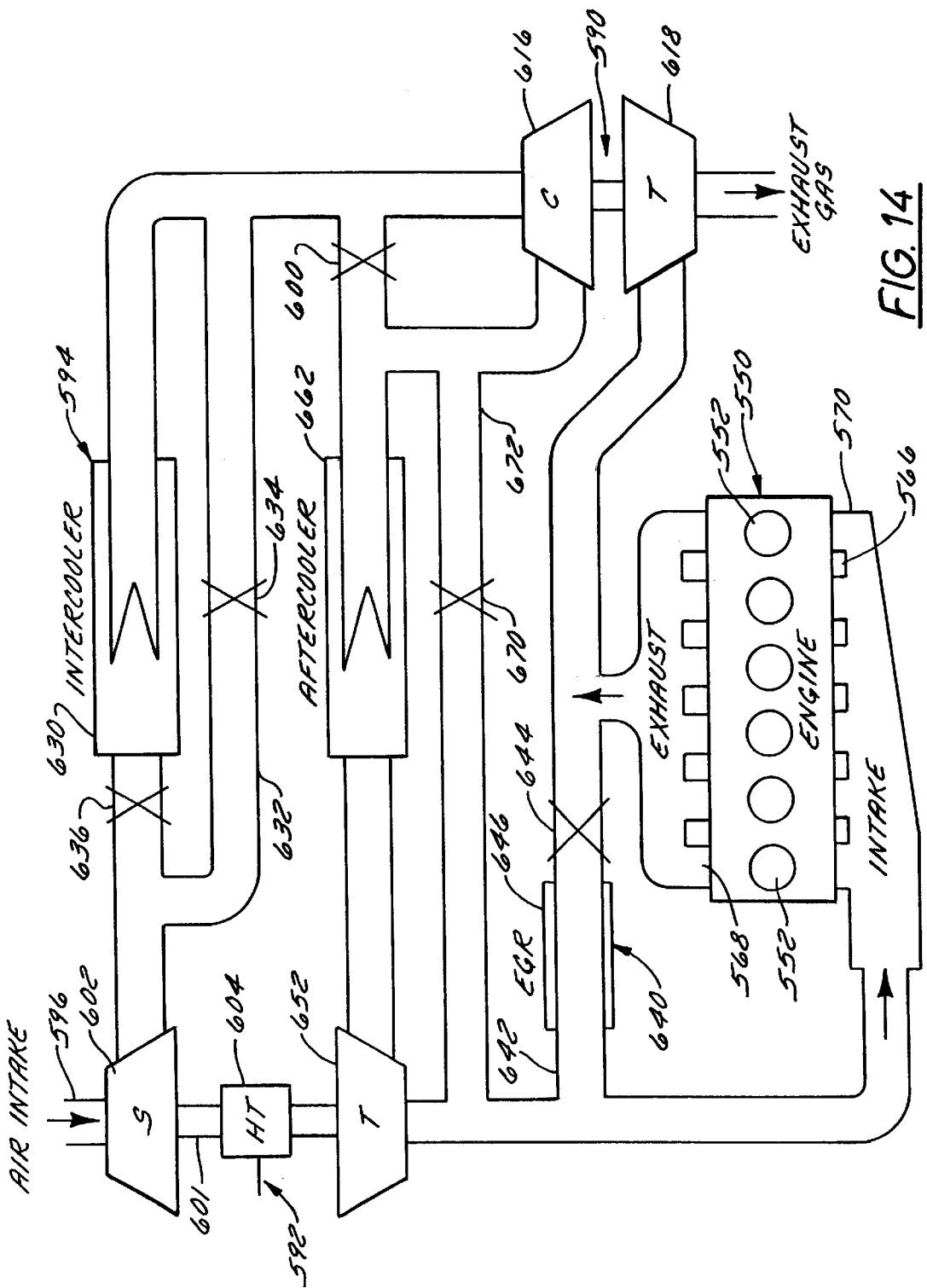
FIG. 14 is a schematic representation of the air supply system of a diesel engine constructed in accordance with a third preferred embodiment of the invention.

An alternative, more elegant approach to incorporating a separate turboexpander into an engine's air supply system for ACT control is to replace the supercharger with one that is also capable of performing the cooling functions of the turboexpander. The resulting air supply system is simpler, less expensive, and has fewer components than an engine employing a separate turbocharger and turboexpander. An engine 550 configured in this manner is illustrated in FIG. 14. Components of the engine 550 of FIG. 14 corresponding to components of the engine 250 of FIG. 10 are designated by the same reference numerals, incremented by 300.

The engine 550 includes a plurality of cylinders 552 supplied with air via an air supply system and with fuel via a fuel supply system. The fuel supply system is identical to that illustrated in FIGS. 5 and 10 discussed above. The air supply system includes a turbocharger 590, a combination supercharger/turboexpander 592, an intercooler assembly 594, and an aftercooler 662. The turbocharger 590 includes a compressor 616 and a turbine 618. A TAB valve 600 permits selective recirculation of turbocharged air back to the system's intake line 596. The intercooler assembly 594 includes an intercooler 630, an intercooler control valve 636, and an intercooler bypass valve 634 located in a bypass line 632. An EGR subassembly 640 (if present) includes an EGR line 642 in which is disposed an EGR valve 644 and an EGR cooler assembly 646.

The combined supercharger/turboexpander 592, like the supercharger 292 of the FIG. 10 embodiment, includes a compressor 602 and a hydraulic turbine 604 mounted on a common shaft 601. Also included but not illustrated are a reservoir, a supercharger control valve and an oil cooler for supplying power to the turbine 604. However, unlike in the previous embodiments, a separate expansion turbine 652 is also mounted on the shaft 601 in order to perform the cooling function of the expansion turbine of the turboexpander of the FIG. 10 embodiment. Superchargers having three operative devices mounted on the same shaft are sometimes known in the art as "three spool" superchargers. A suitable three spool supercharger is disclosed in U.S. Pat. No. 4,285,200 to Bryne et al., the subject matter of which is hereby incorporated by reference. The turbocharger disclosed in the Bryne et. al. patent includes a turbocharger operable as the compressor 602 of the combined supercharger/turboexpander 592, a hydraulic turbine operable as the hydraulic turbine 604 of the combined supercharger/turboexpander 592, and a turbine wheel which, when coupled to the remainder of the air supply system as illustrated in FIG. 14, is operable as the turbine 652 of the combined supercharger/turboexpander 592 (it should be noted that, prior to the development of the present invention, the turbine or third spool disclosed in the Bryne patent was not intended for use as a gas cooling device). The turbine 652, like the expansion turbine 352 of the turboexpander 350 of the FIG. 10 embodiment, is located in a branch line of the air supply system in a location downstream of the intercooler assembly 594 and is controlled by operation of a control valve 670 located in a line 672 that bypasses the expansion turbine 652 and the aftercooler 662. This valve 670 is a variable-orifice, electronically actuated valve controllable by the ECU 150 so as to vary the cooling effect of the turboexpander turbine 652 from zero to a maximum depending upon the closing degree of the valve 670. In use, air flowing through the turbine 652 transfers energy in the form of heat to the turbine 652 and thereby is cooled. This energy then is absorbed by the compressor 602 which, as detailed above, also functions as the turbocharger compressor. The cooling effect of the turbine 652 can be modulated through the control of the control valve 670.

It can thus be seen that the compression and energy absorption functions can be achieved by a single structure which is mounted on the same shaft as the remaining supercharger components. The resultant system is simpler, more elegant, and less expensive than a system employing a separate supercharger and turboexpander. In addition, the engine 550, like the Engine 250 of the FIG. 10 embodiment, is capable of using propane as a fuel because the combined supercharger/turboexpander 592, like the turboexpander of the FIG. 10 embodiment, is capable of reducing ACT to below ambient temperature, which is required to avoid engine knock when burning propane under high load.

7. Comments on Exhaust Gas Recirculation (EGR)

The effect of EGR on the reduction of NO$_x$ emissions in diesel engine exhaust is well known and can be quite effective. However, for reasons that will become apparent, EGR may not be necessary with the present invention and its deleterious effects that argue for its elimination or at least for limiting its use.

EGR causes a reduction in NO$_x$ by two effects, namely: 1) reduction in peak compression temperature and the corresponding peak cycle (average) temperature; and 2) reduction in stoichiometric flame temperature by reduction of oxygen concentration and dilution of the combustion reaction. Since selection of optimum lambda will affect peak cycle temperature and, to a lesser extent, stoichiometric flame temperature, it would appear to be prudent to select optimum lambda prior to the addition of EGR. With such an approach, the optimum lambda system can be treated as a stand-alone system and operated with or without EGR. Moreover, for gas fueled engines EGR and increased lambda have almost the same effect on reduction of NO$_x$ because, in the case of lean burn premixed combustion, there is little or no stoichiometric flame. Consequently, for pre-mixed combustion, EGR can be totally replaced by increased lambda. In diesel engines, the extent of stoichiometric burning (inevitable with a heterogeneous fuel air mixture) can be minimized by faster injection, atomization and vaporization. The most effective use of EGR therefore can be made after the optimization of lambda, ACT and fuel and air mixing for either gas fueled premix engines or diesel engmes.

NO$_x$ emissions can be greatly reduced when a diesel engine runs on pre-mixed fuel and air with compression ignition using a liquid pilot fuel. This is because the stoichiometric burning that occurs around burning droplets is eliminated and the peak temperature is limited largely to that of a lean burn mixture rather that the flame temperature of a stoichiometric mixture. High injection pressure serves the function of increasing turbulent mixing and thereby reduces the fraction of the fuel that burns at overly rich mixture. EGR, on the other hand, functions as a NO$_x$ reducer largely by reducing the stoichiometric flame temperature and normally does not enhance mixing.

Some investigators have reported that NO-$_x$ is reduced by the addition of EGR at fixed injection timing of the pilot fuel. However, it is now believed that this effect occurs at least partially because of an increase in ignition delay which thus effectively retards ignition timing and reduces NO$_x$ by 70% per degree of ignition retard. If diesel combustion is managed to emulate pre-mixed lean burn combustion, NO$_x$ can be controlled by lambda, ACT and ignition timing alone. In such cases EGR, becomes neither necessary nor desirable.

8. Cylinder Pressure Based Optimization Control

Much of the preceding discussion can be found in parent application Ser. No. 991,413, and the lambda optimization control schemes discussed therein are usable in conjunction with the present invention either as part of the inventive cylinder pressure-based optimization control scheme or as an independent control scheme. Both schemes are implementable on all of the same types of compression ignition engines.

Pursuant to one aspect of the invention, air/fuel ratio (lambda) adjustment relying at least primarily on airflow management for lambda adjustment is used to optimize a parameter of engine operation that is at least indirectly dependent on in-cylinder pressure and that, when optimized, obtains a desired engine performance chacteristic such as BSFC, NO$_x$, etc. Hence, as in the parent application, lambda is still adjusted to optimize engine performance. However, instead of actually detecting lambda and controlling it to obtain a target or optimum lambda, cylinder pressure is instead detected, and a pressure-dependent parameter is monitored and controlled through airflow management to optimize the pressure-dependent parameter. The monitored and controlled parameter is preferably, but not necessarily, a cylinder pressure ratio (CPR) obtained by sensing pressure at two or more points in the relevant thermodynamic cycle and by determining CPR from the sensed pressures. Engine operating characteristics other than lambda can also be adjusted, and engine operating parameters other than CPR can also be optimized.

Figure 15:
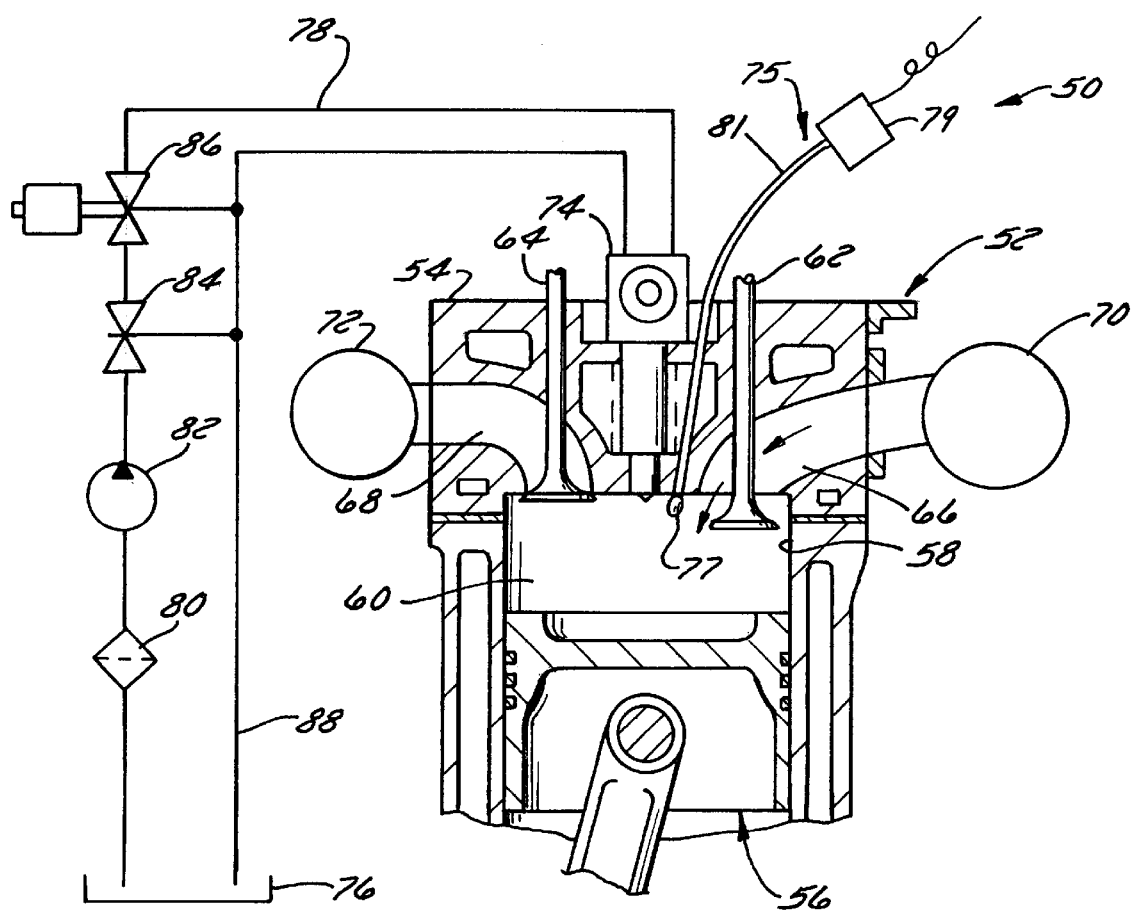
FIG. 15 is a partially schematic sectional elevation view of a cylinder of the engine of FIG. 4, modified to incorporate an in-cylinder pressure sensor.
Figure 16:
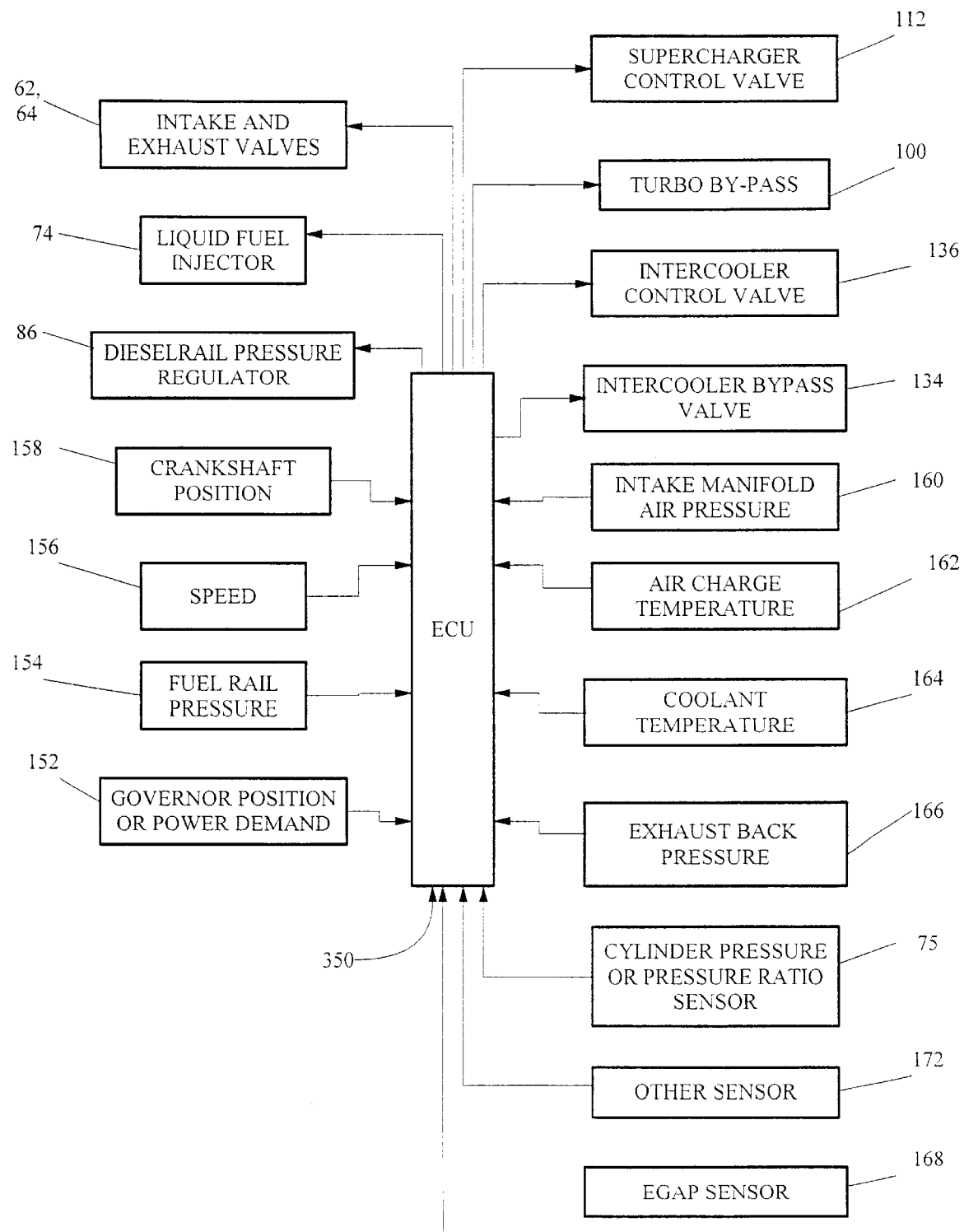
FIG. 16 is a schematic view of the sensor and electronic controls of the engine as modified in FIG. 15.
Figure 17:
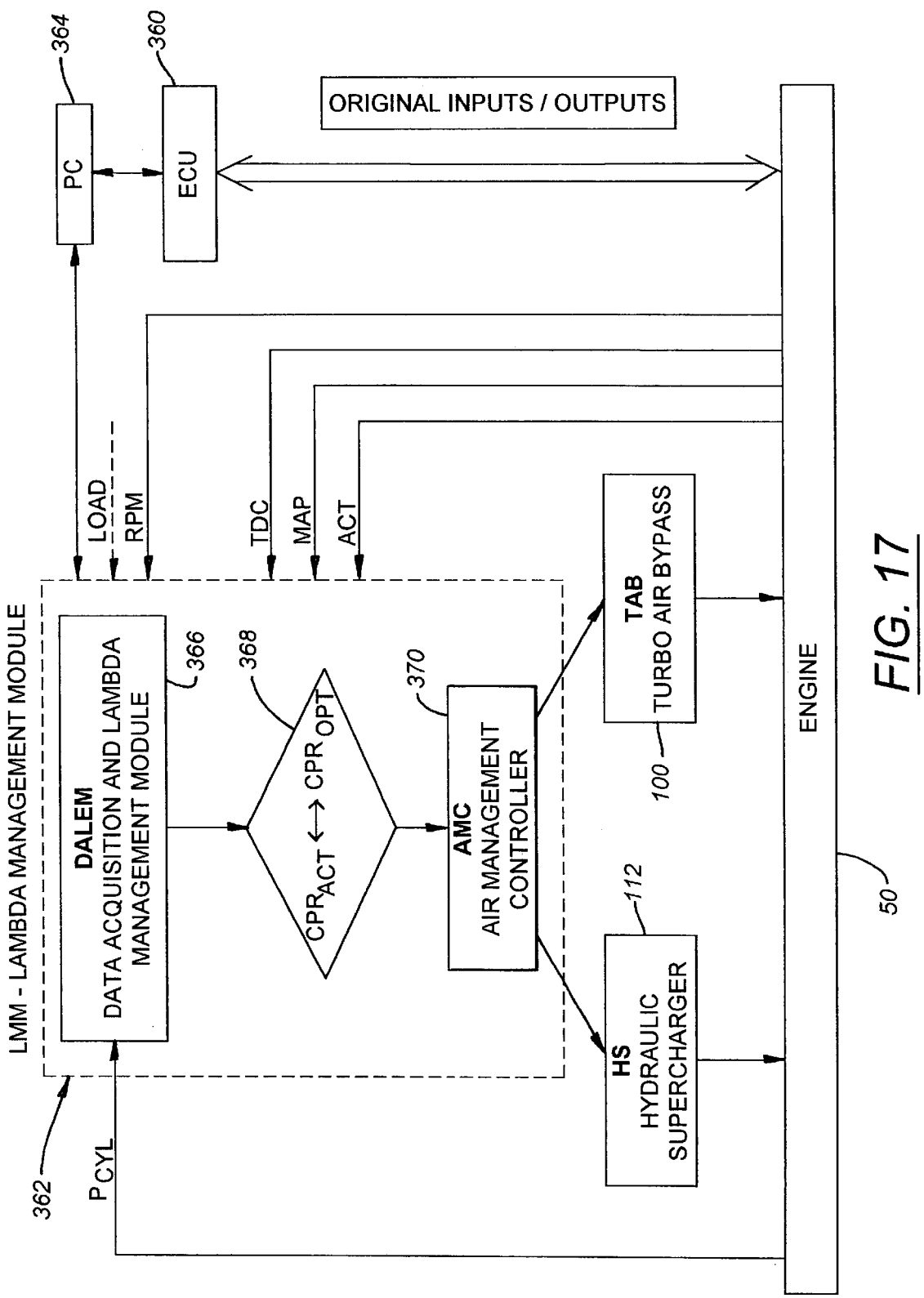
FIG. 17 schematically illustrates the major control elements of the engine of FIGS. 4, 15, and 16, configured in an alternative arrangement to that illustrated in FIG. 16.

A portion of an engine constructed so as to optimize operation of a cylinder pressure-dependent parameter through airflow management based on in-cylinder pressure measurement is illustrated in FIGS. 15–17. The engine is the same engine 50 of FIG. 4, modified to implement the invention. The cylinder 52 of this engine, best seen in FIG. 15, therefore is the same cylinder of FIG. 5 except for the inclusion of an additional sensor 75 discussed below. The cylinder 52 therefore includes a piston 56 slidably disposed in a bore 58 thereof to define a combustion chamber 60 between the cylinder head 54 and the piston 56. The piston 56 is also connected to a crankshaft (not shown) in a conventional manner. Inlet and exhaust valves 62 and 64 are provided at the end of respective intake and exhaust passages 66 and 68 in the cylinder head 54. Air is supplied to the supply passages 66 of the cylinder 52 as well as the remaining cylinders from a conventional air intake manifold 70. Exhaust products are exhausted from the exhaust passages 68 of the cylinder 52 as well as the remaining cylinders via an exhaust manifold 72. Valves 62 and 64 may be actuated by a standard camshaft (not shown). However, the preferred valves are camless, electro-hydraulically controlled valves capable of modulating the supply of air to and the exhaust of combustion products from the combustion chamber 60. Various devices for electronically controlling intake and exhaust valves have been designed and demonstrated. Some large diesel engines currently in production utilize hydraulically actuated exhaust valves.

Still referring to FIG. 15, each cylinder 52 is supplied with diesel fuel or another liquid fuel ignitable by compression via an electronically controlled fuel injector 74. Injector 74 preferably takes the form of an electro-hydraulic fuel injector and more preferably a pressure-intensified accumulator-type injector of the type disclosed in reissue U.S. Pat. No. 33,270 to Beck (the Beck '270 patent), the subject matter of which is hereby incorporated by reference. The injector 74 is supplied with diesel fuel or the like from a conventional tank 76 via a supply line or common rail 78. Disposed in line 78 are a filter 80, a pump 82, a high pressure valve 84, and a fuel rail pressure regulator 86. A return line 88 also leads from the injector 74 to the tank 76. As is known in the art and detailed in the Beck '270 patent, the injector 74 and rail pressure regulator 86 can be controlled on a cycle by cycle and cylinder by cylinder basis to adjust fuel injection timing, duration, and quantity.

The cylinder 52 as illustrated in FIG. 15 is modified from its construction as illustrated in FIG. 5 only that includes an in-cylinder pressure sensor 75. The sensor 75 may be any sensor having a sensing element locatable within the chamber 60 and capable of withstanding the heat and pressures associated with operation of a compression ignition engine and of operating in the presence of volatile gases in the chamber 60. For instance, because the preferred embodiment of the control scheme (detailed below) utilizes a cylinder pressure ratio in its calculations, a sensor could be used which detects cylinder pressure ratio directly rather than detecting absolute pressures. A sensor that detects absolute pressure in the cylinder 60 is, however, preferred because it facilitates a wider range of pressure-based calculations, some of which require absolute pressure measurements. In addition, while the sensor 75 is illustrated as being installed directly in the cylinder head 54, it could also be integrated into the design of diesel fuel injector 74.

A particularly preferred form of the sensor 75 is a fiber optic sensor, which is illustrated schematically in FIG. 15. The sensor 75 includes 1) a sensor head 77 located within the chamber 60, 2) a signal conditioner 79 located outside of the cylinder 52, and 3) two fiber optic cables 81 leading from the sensor head 77 to the signal conditioner 79. The sensor head 77 includes a sensor housing (not shown) and a sculpted diaphragm (also not shown) on the end of the sensor housing. The fiber optic cables 81 run through the sensor housing so as to face an inner surface the diaphragm. The cables 81 detect fluctuations in light intensity resulting from diaphragm movement occurring upon pressure changes in the combustion chamber 60 and transmit light signals to the signal conditioner 79. The signal conditioner 79 then converts the optical signals to electrical signals and transmits the electrical signals to a controller 350 (detailed below in conjunction with FIG. 16) or a management module 362 (detailed below in conjunction with FIG. 17) in the form of a cylinder pressure signal P$_{cyl}$ obtained at a data point during the thermodynamic cycle. The sensor 75 has high sensitivity and a high signal-to-noise ratio. It is also immune to electromagnetic interference. It is also linear to within 1%, including hysteresis and thermal shock. Linearity is important where, as here, a ratio is determined. A suitable fiber optic sensor is disclosed in SAE Paper 981913 by Wlodarczyk et al., the subject matter of which is hereby incorporated by reference by way of background material.

Referring now to FIG. 16, an ECU 350 configured for operation with the engine of FIG. 15 may comprise any electronic device capable of monitoring engine operation and of controlling the supply of fuel and air to the engine. In the illustrated embodiment, the ECU 350 comprises a programmable digital microprocessor. The ECU 350 receives signals from various sensors, including the above-described governor position or power demand sensor 152, fuel rail pressure sensor 154, engine speed (rpm) sensor 156, crankshaft position sensor 158, intake manifold absolute (MAP) sensor 160, intake manifold air charge temperature (ACT) sensor 162, engine coolant temperature sensor 164, EBP sensor 166 and EGAP sensor 168. Unlike the preceding embodiments in which the ECU 150 also received signals from a lambda sensor, the ECU 350 of this embodiment instead receives signals from the sensor 75 of FIG. 15 or another sensor providing cylinder pressure signals or even cylinder pressure ratio signals. Finally, as in the preceding embodiment, any other data required for engine control is supplied by way of other sensor(s) 172.

The functions of the ECU 350 of FIG. 16 may also be divided into multiple, interconnected controllers configured to maximize the engine's airflow management capabilities. Hence, as illustrated in FIG. 17, the ECU 350 may be replaced by 1) an ECU 360 that controls the fuel injectors 74 and 2) a lambda management module 362 that adjusts airflow. The lambda management module 362 may be provided in the same computer as the ECU 360 or even within the ECU 360. Alternatively, and as in the illustrated embodiment, the lambda management module 362 could be connected to the ECU 360 either directly or by a separate computer such as a conventional PC 364, which may be included for evaluation and testing but which can be omitted from most systems. The lambda management module 362 receives all information required for a lambda optimization and/or CPR optimization, including a pressure signal $P_{cyl}$ from the cylinder pressure sensor 75, an rpm signal from the speed sensor 156, a signal TDC from the crankshaft position sensor 158 indicative of angular position, including a top dead center position, a MAP signal from the intake manifold air pressure sensor 160, and an ACT signal from the ACT sensor 162. A load signal is also provided to the lambda management module 362 after prevailing engine load is calculated as detailed below. Located within the lambda management module 362 are 1) a data acquisition and lambda management module 366 that acquires the data from the various sensors and performs calculations required for CPR control, 2) CPR analysis circuitry 368 that compares $CPR_{act}$ to $CPR_{opt}$, and 3) an air management controller 370 that controls equipment such as the supercharger control valve 112 or the TAB valve 100 to increase or decrease the airflow to the engine 50. The components 366, 368, and 370 may take the form of hard-wired circuits, programmed software, firmware, or combinations thereof.

Figure 18:
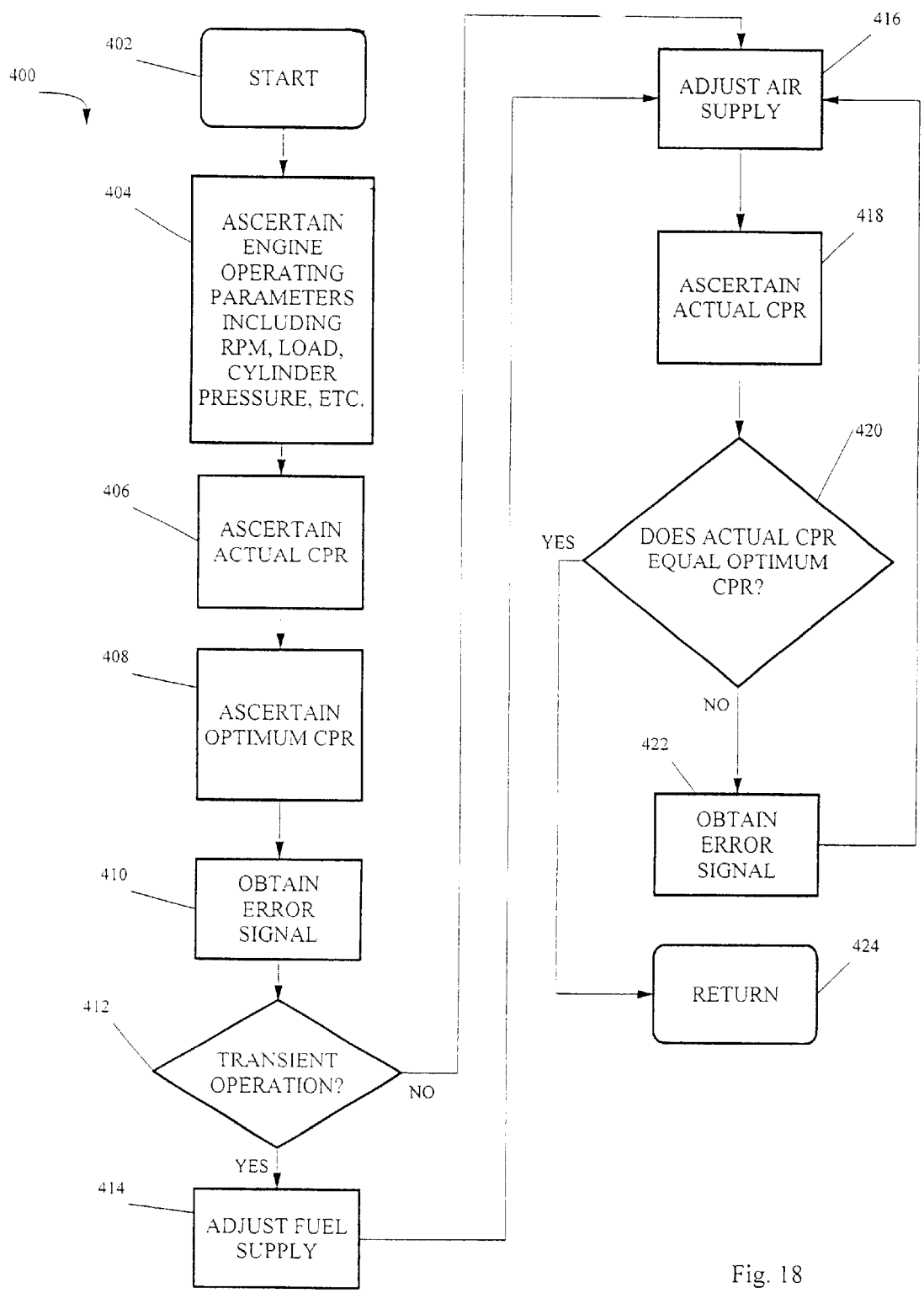
FIG. 18 is a flowchart of a closed loop, full range, and full time control scheme for the optimization of cylinder pressure ratio (CPR) by adjusting lambda in accordance with the invention.

Turning now to FIG. 18, a process 400 performable by the control system of FIG. 17 or the ECU 350 of FIG. 16 is illustrated and is configured for the closed-loop optimization of CPR on a continuous, cycle-by-cycle basis. The process proceeds from Start in step 402 to step 404 in which various engine operating parameters including rpm, load, cylinder pressure, etc. are obtained using signals from sensors including the sensors 156, 75, etc. above (load is calculated independently as detailed below in connection with step 408).

Next, an actual CPR prevailing in a thermodynamic cycle is calculated in step 406 on a real-time basis. This technique involves acquiring cylinder pressure data at only a small number of crankshaft angles within the thermodynamic cycle and computing a cylinder pressure ratio indicative of pressure changes resulting from combustion. At a minimum, first and second pressure values $P_o$ and $P_a$ are be obtained before and after the cylinder 56 reaches its top dead center (TDC) position. $P_a$ is preferably acquired after combustion is complete, and $P_o$ preferably is acquired early in or at the beginning of the compression stroke of the cylinder 56. In the embodiment illustrated in FIG. 19, $P_a$ and $P_o$ are obtained in a "mirror image" fashion, i.e., equidistantly away from the TDC position of the cylinder 56. $P_o$ and $P_a$ could also be calculated by averaging multiple data points obtained closely around these mirror image crank angle values or through a least squares or other linear regression analysis. The sampling period between $P_o$ and $P_a$ should be long enough to assure that pressure changes due to fuel charge combustion are accurately reflected. Burn rate-based calculations, though possible and beneficial for some calculations, are not essential to the present invention, and there is therefore no need to sense pressure early enough in the combustion period to rely on burn rate for calculations. In fact, because the relationship between lambda and the heat release rate (HRR) is inverse in a heterogeneous compression ignition charge when compared to a homogeneous spark ignited charge, data need not be taken during combustion for CPR determination. Moreover, in a compression ignition engine, the combustion interval actually decreases slightly with an increase in lambda, making it more difficult to obtain data during combustion. Pressure measurements taken after combustion are also immune to thermal shock error. Monitoring therefore preferably extends well over ±30° crank angle from TDC and, even more preferably, about ±100° from TDC, assuming that data is obtained in a mirror image fashion. However, this symmetrical measurement is not essential to the invention, and non-symmetrical measurements can be obtained, if desired.

If the sensor 75 is one that is subject to drift or otherwise requires calibration, an additional pressure signal can be obtained and compared with a known pressure. One known pressure within the combustion chamber 60 equals the MAP pressure at the bottom dead center (BDC) position of the cylinder 56. Hence, a comparison of a pressure signal obtained from sensor 75 at BDC can be compared to the MAP pressure as measured independently by sensor 160 and used to calibrate the sensor 75 on a cycle-by-cycle basis or as otherwise required.

Hence, a maximum of three data points are required to determine CPR (the third, calibration data point would not be necessary if the sensor never required calibration.) This is in sharp contrast to previously-known techniques, such as those disclosed in the above-mentioned Matekunas patents, that required a minimum of five data points.

Next, in step 408, the optimum CPR ($CPR_{opt}$) is ascertained at the prevailing engine operating conditions. As with lambda, $CPR_{opt}$ for particular application will depend upon the engine operating characteristic(s) sought to be optimized. For instance, a first value of $CPR_{opt}$ will be selected if one wishes to optimize a tradeoff between BSEC and $BSNO_x$, whereas another value of $CPR_{opt}$ will be selected if one wishes to minimize smoke and particulate emissions at prevailing engine operating conditions. $CPR_{opt}$ preferably is selected from a look-up table as a function of the prevailing engine load and the prevailing engine speed. The relationship between CPR and BSEC at various speed and load conditions is illustrated in FIGS. 20–23. Similarly, the relationship between CPR and $NO_x$ is illustrated graphically in FIGS. 24–27. Prevailing engine load may be obtained via any of a number of techniques, some examples of which will now be detailed.

First, at a given rpm, engine load is directly dependent upon the mass of fuel $M_F$ consumed in the combustion cycle. If the engine is one in which a specified quantity of fuel ($Q_{com}$) is commanded and supplied in a particular cycle, then load can be calculated quite easily as Load=$f(Q_{com}, rpm)$, where $Q_{com}$ is presumed to be equal to $M_F$. This technique is in use today by several engine manufacturers for other applications.

Figure 19:
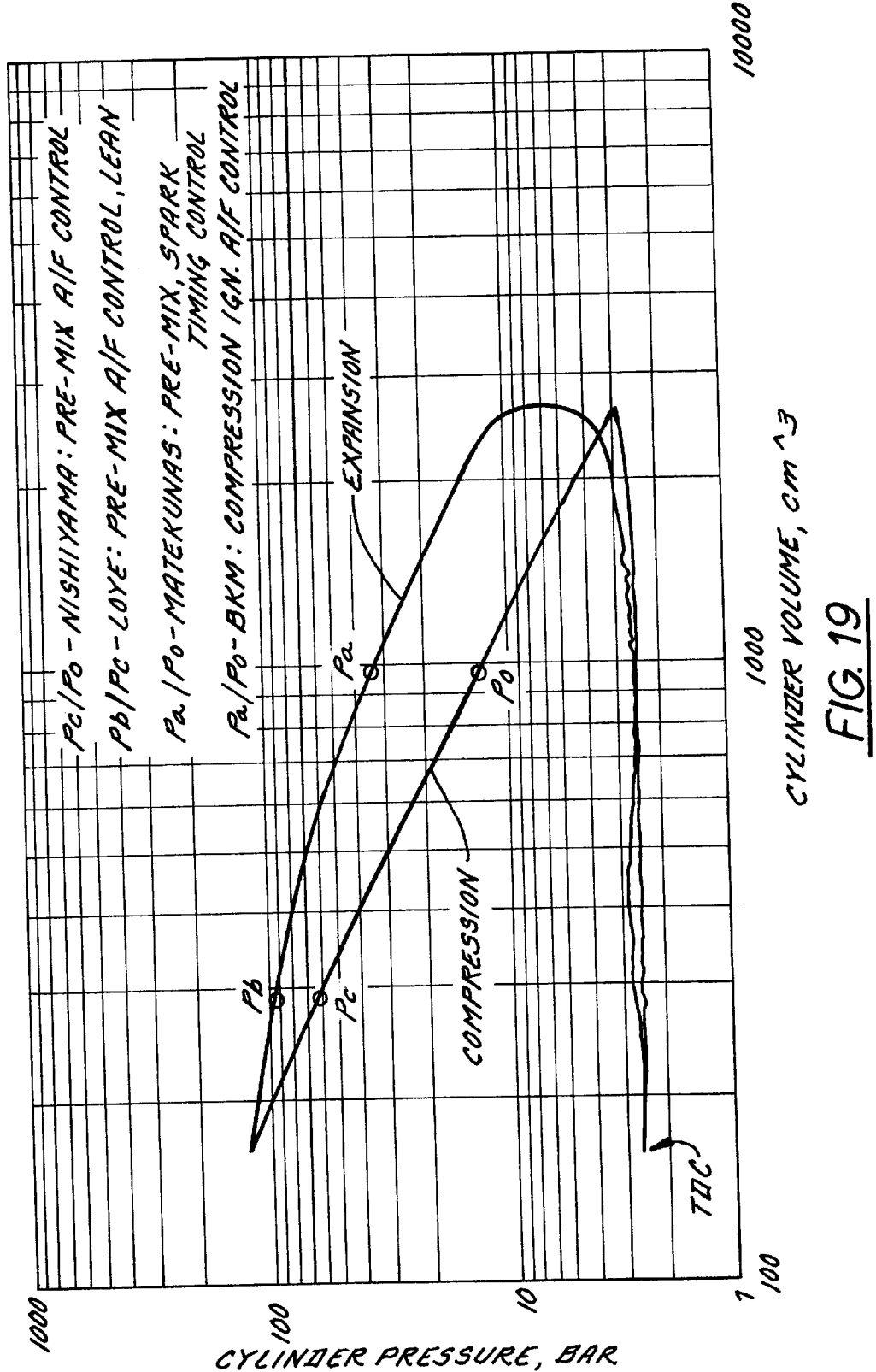
FIG. 19 is a graph of cylinder pressure versus cylinder volume and illustrates pressure sampling points for various types of pressure-based engine control systems.
Figure 20:
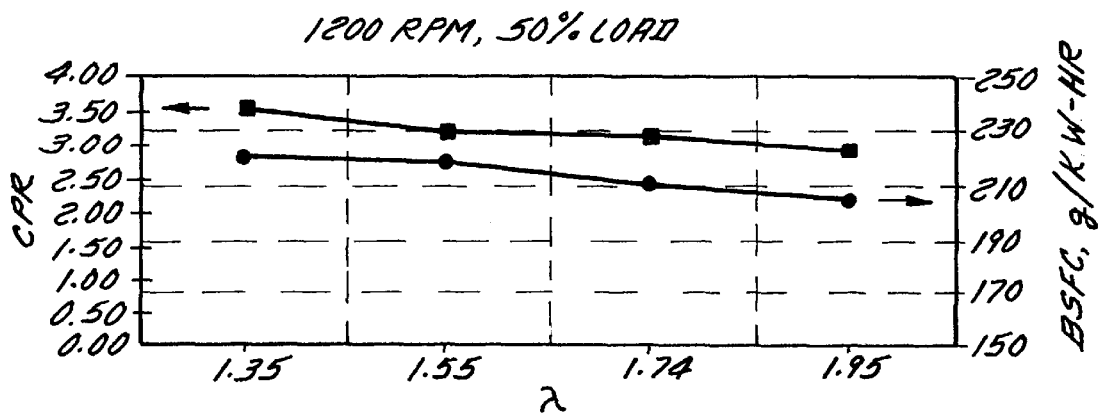
FIGS. 20–23 graphically illustrate the relationship between BSFC and CPR at various speeds and load conditions.
Figure 21:
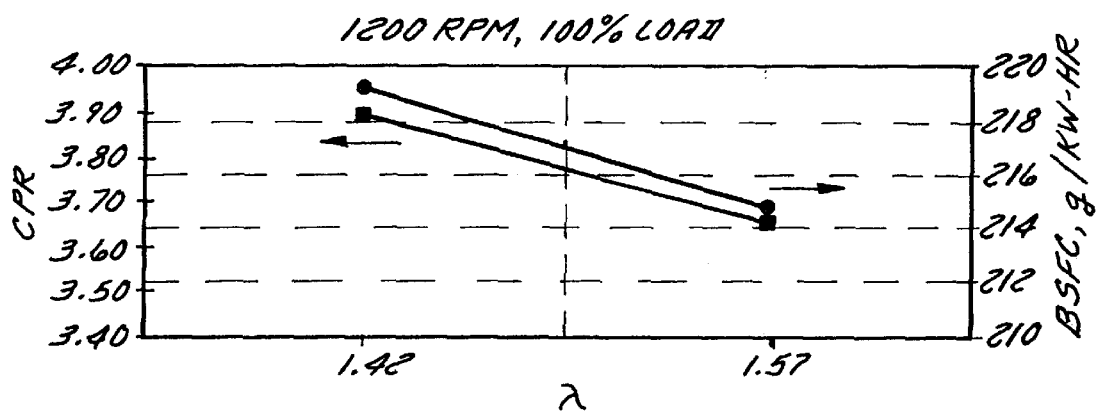
Figure 22:
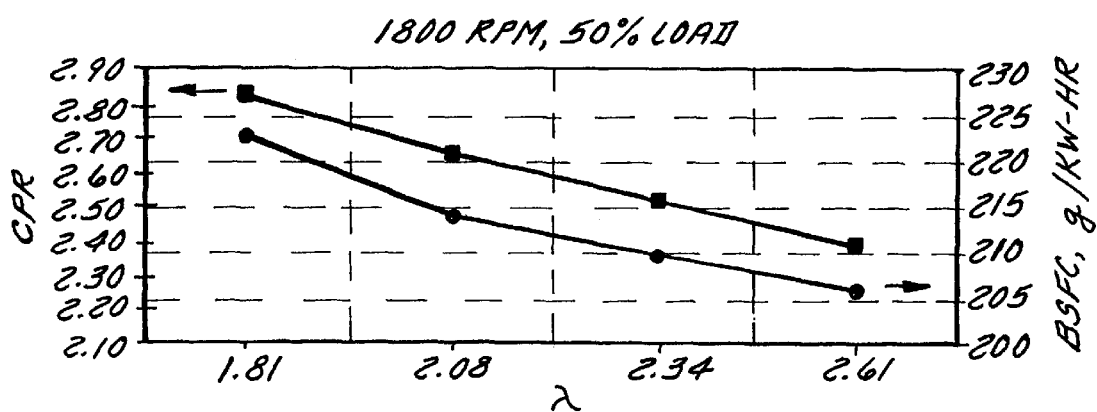
Figure 23:
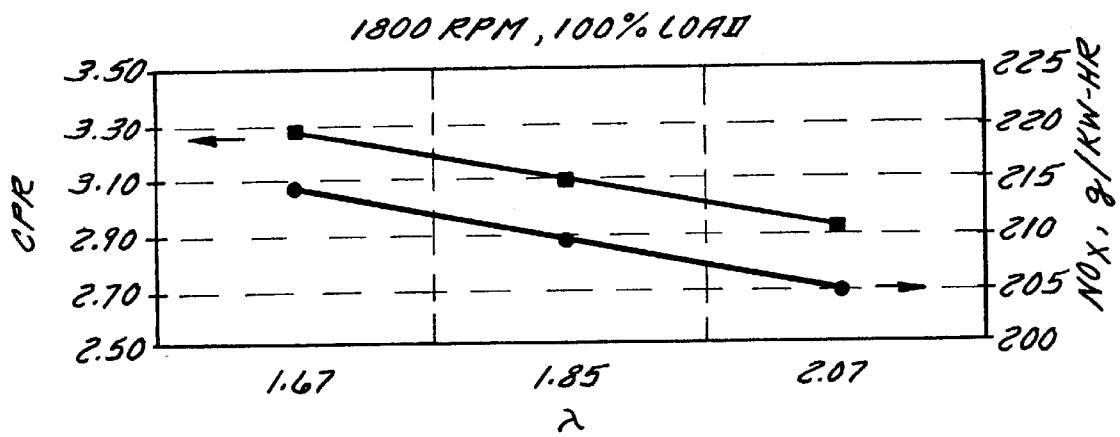
Figure 24:
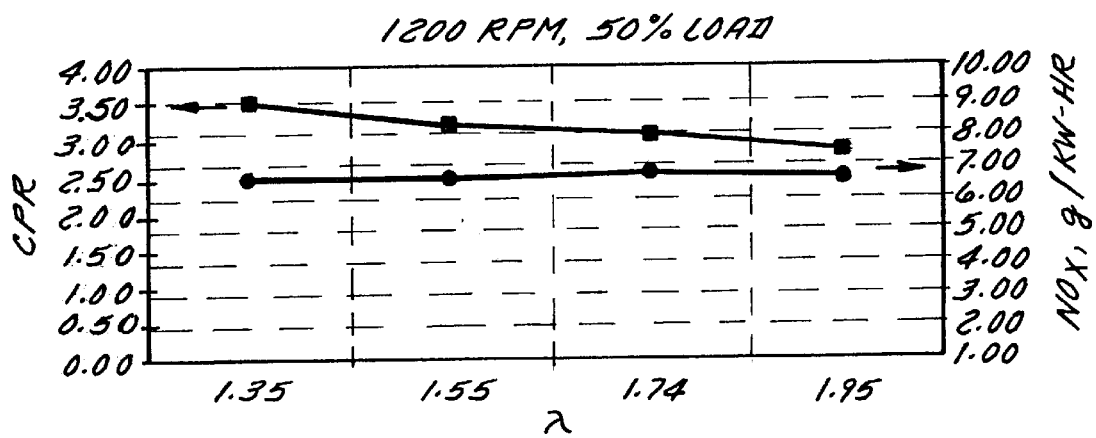
FIGS. 24–27 graphically illustrate the relationship between $NO_x$ and CPR at various speed and load conditions.
Figure 25:
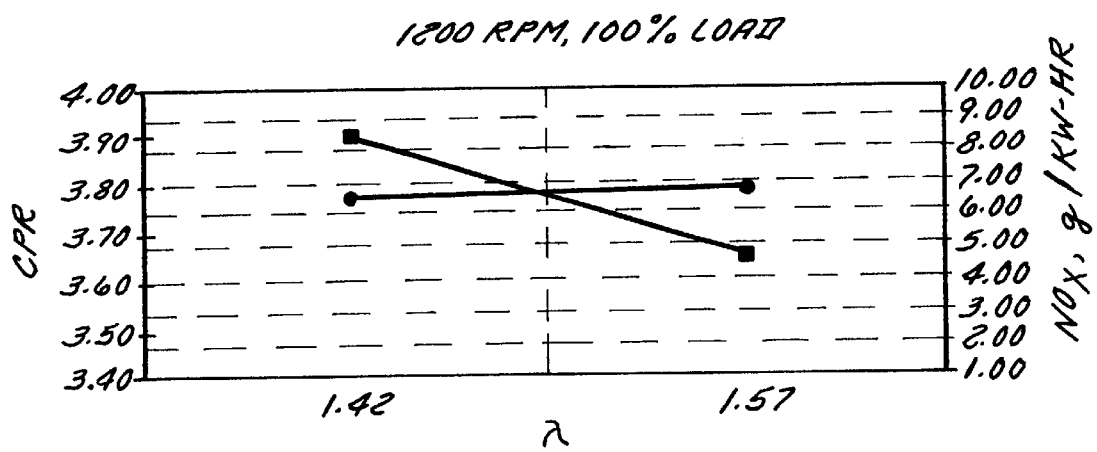
Figure 26:
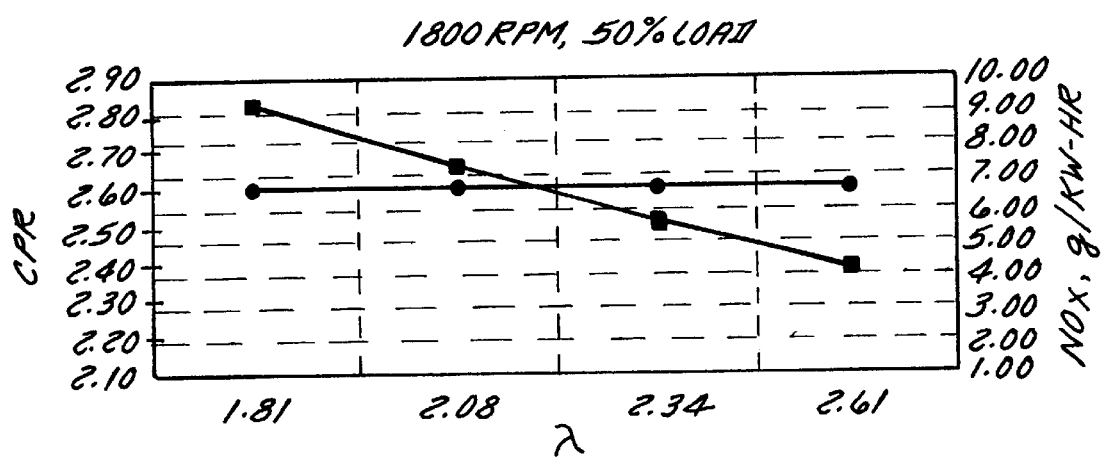
Figure 27:
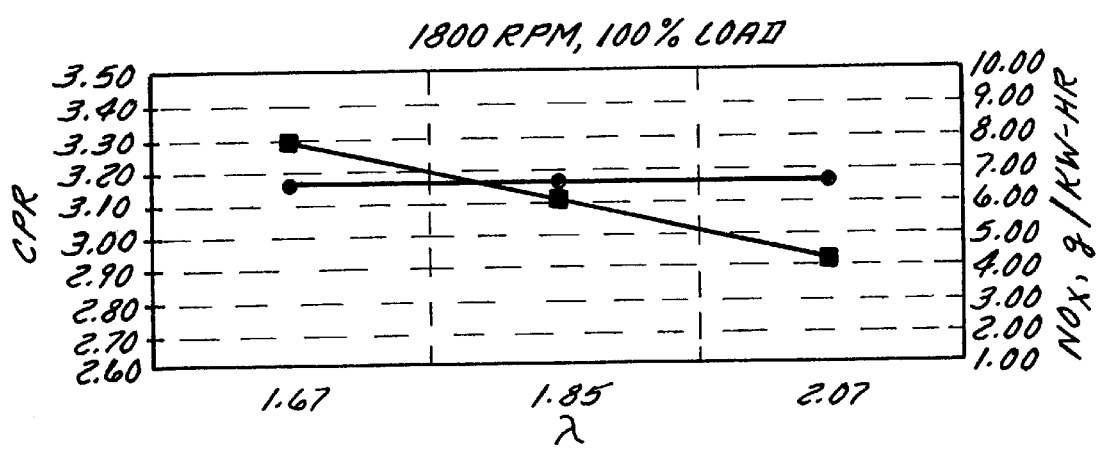

If $M_F$ is not known in advance, $M_F$ can be determined via other techniques, thereby retaining the ability to determine load as a function of $M_F$ and rpm. One such technique uses a "cylinder pressure difference" method to determine $M_F$ and, hence, to permit a determination of engine load. This method is based on the fact that the pressure difference CPD=$P_a$–$P_b$ in FIG. 19 is a unique function of the quantity of fuel delivered during the thermodynamic cycle. The relationship between CPD and $M_F$ is shown in Equation.1, which is derived from the energy conservation equation for a closed system (the First Law of thermodynamics) in which data is obtained at ±100° crank angle.

$$MF = \left\{ \frac{\kappa-1}{V(100)} \int_{\theta_1}^{100} \left( \frac{V}{V(100)} \right)^{\kappa-1} \left[ \frac{d\mu_F}{d\theta} - \frac{d\mu_{qF}}{d\theta} \right] d\theta \right\} h_c CPD \quad \text{Eq. 1}$$

where:

$\kappa$ - isentropic exponent, ratio of specific heats at constant pressure and constant volume;

$\theta$ - crank angle (independent variable);

$V$ - instantaneous cylinder volume;

$\mu_F$ - burned mass fraction of fuel;

$\mu_{qF}$ - ineffective part of burned mass fraction of fuel; and $h_c$ - heat of combustion.

This unique, close to linear relationship between CPD and $M_F$ has been checked and confirmed experimentally in a typical modern turbocharged diesel engine at different speed and load points. Hence, $M_F$ can be determined, using Eq. 1 empirically derived data without determining engine speed or lambda. Another advantage of this method is that, unlike the methods discussed previously, no MAP data is required, and the same pressure samples are used for both CPR and CPD. The effects of engine aging and other influences on measurement accuracy also are automatically taken into account.

A variant of this approach relies on continuous pressure sampling. This method determines $M_F$ by using the First Law of thermodynamics and continuous pressure measurements obtained during a thermodynamic cycle to calculate the mass of fuel that is burned during that cycle. Actual engine load is then determined from a look-up table similar to the previous methods.

Specifically, the mass of fuel burned in a given cycle can be calculated from the following Equation 2:

$$MF = \frac{1}{LHV} \int_i^f \frac{dQ_{CH}}{dt} dt \quad \text{Eq. 2}$$

where:
LHV—fuel Lower Heating Value;
i—start of combustion; and
f—end of combustion.
and where, the total heat released $$\frac{dQ_{CH}}{dt}$$

from fuel chemical energy is determined by the following equation:

$$\frac{dQ_{CH}}{dT} = \frac{dQ_{ht}}{dt} + p\frac{dV}{dt} + \frac{1}{\kappa-1}\frac{dpV}{dt} \quad \text{Eq. 3}$$

$$\frac{dQ_{CH}}{dt}$$

can be accurately calculated using one of several well established semi-empirical correlations such as the Oschni equation.

This method can be applied when retrofitting an existing engine. It exhibits improved sensitivity when compared to the cylinder pressure difference method at light loads. Engine aging also is taken into account. Moreover, only one input signal is required, namely, cylinder pressure.

Still another approach for determining load relies on the fact that, at a given rpm, load is also directly dependent on MAP. Hence: load=f(MAP, rpm). Stated another way, load can be ascertained from suitable empirically-determined look-up tables once MAP and rpm are known. This method of load determination is advantageous in retrofit situations in which the engine's original ECU is not accessible.

Once $CPR_{opt}$ is calculated, an error signal ERR is generated in step 410 by determining the difference between $CPR_{opt}$ and $CPR_{act}$. This then permits CPR adjustment in the next thermodynamic cycle. A very high ERR will indicate transient engine operation (a sudden and sharp increase or decrease in commanded power) that will hinder or even preclude CPR optimization by airflow management alone. In order to take this possibility into account, the process 400 inquires in step 412 whether or not the engine 50 is undergoing transient operation. If so, the ECU 350 of FIG. 16 or, alternatively, the ECU 360 of FIG. 17 will adjust the operation of the fuel injector 74 and/or the rail pressure regulator 86 in step 414 to temporarily reduce or increase the fuel quantity with respect to the commanded quantity by the amount required to obtain CPR optimization at the prevailing engine operating conditions. The duration (i.e., number of thermodynamic cycles) and magnitude of this fuel supply adjustment will vary with the severity of the transient condition and the response time of the airflow management system. Fuel supply adjustment will terminate as soon as the engine is capable of optimizing CPR by airflow management alone.

The process 400 then proceeds to step 416 for air supply adjustment. This adjustment preferably will include at least an adjustment of the position of the supercharger control valve 112 if the airflow needs to be increased or adjustment of the TAB valve 100 if airflow needs to be decreased (Other airflow control schemes could be employed as well). The magnitude of adjustment preferably is set to be proportional to the magnitude of the error signal ERR in order to minimize the number of iterations required for CPR optimization.

Next, in step 418, $CPR_{act}$ is again ascertained in the next thermodynamic cycle using the determined values of $P_o$ and $P_a$ as discussed above, and $CPR_{act}$ is once again compared to $CPR_{opt}$ in step 420 to determine whether or not $CPR_{act}$ is approximately equal to $CPR_{opt}$. If not, the magnitude of the error signal ERR is once again obtained in block 422, and the process 400 returns to step 416 where the air supply is once again adjusted, with the magnitude of adjustment once again being proportional to the magnitude of the error signal ERR. The process 400 then proceeds through blocks 416, 418, 420, and 422 in a reiterative, closed-loop fashion until $CPR_{act}$ is approximately equal to $CPR_{opt}$, at which point the process 400 proceeds to Return in block 424.

The above-described closed-loop process is repeated, on a cylinder-by-cylinder and cycle-by-cycle basis, preferably whenever the engine 50 is operating, throughout the speed and load ranges of the engine 50. This full time and full range control achieves steady state CPR optimization that heretofore would not have been achieved in any compression ignition engine.

Thermodynamic analysis reveals that there is a monatomic relationship between lambda and CPR. Hence, CPR-based measurements can be used, directly or indirectly, to optimize lambda. This pressure ratio/lambda correlation method is often desirable because the memory and computational requirements for data collection, reduction, and evaluation are suitable for contemporary ECU hardware. $\lambda_{opt}$ could be determined using any of the techniques discussed in the preceding sections above or could be determined from $CPR_{opt}$ after $CPR_{opt}$ is determined. $\lambda_{act}$ can be empirically determined from $CPR_{act}$ at prevailing engine operating conditions (including speed and load), using lookup tables or the like or analytically via suitable equations.

Direct in-cylinder pressure measurements can also be used to obtain other useful information concerning engine operating conditions.

For instance, engine knock in dual fuel engines can be detected using only CPR measurements. Specifically, CPR can be monitored statistically over a relatively large number of thermodynamic cycles. A statistically significant deviations in CPR at constant speed, load, lambda and temperature would indicate combustion instability such as knock.

In addition, in-cylinder pressure measurements permit the magnitude and location of the maximum cylinder pressure (MCP) to be determined. MCP can be used for many purposes such as for detecting knock. Since both the magnitude and cyclic variation of MCP will increase significantly during knocking conditions, this effect can be utilized immediately to initiate corrective action to eliminate knock by adjusting parameters such as reducing fuel quantity, increasing lambda, and/or retarding ignition timing.

For lambda optimization purposes, a maximum cylinder pressure ratio (MCPR) can be calculated as:

$$MCPR = MCP/P_o \qquad \text{Eq. (6)}$$

If this equation is expanded, it becomes obvious that signal resolution is improved when using MCPR instead of simply CPR:

$$MCPR = \frac{MCP}{P_o}\frac{P_o}{P_a} = \frac{MCP}{P_o}\frac{1}{CPR} \qquad \text{Eq. (7)}$$

Real-time MCP data can also be used to optimize other engine operating characteristics. For instance, MCP can be directly correlated to engine noise, and noise can be minimized in a closed-loop control scheme using control variables including injection timing, pre-injection and pilot injection quantity and dwell time, lambda, ACT, etc.

Sensed MCP may also be used to optimize engine power density (EPD) with respect to its structural limits. EPD ($kW/m^3$ of envelope volume or $kW/dm^3$ of displacement) is a direct function of BMEP. Increasing BMEP is practically constrained by, among other things, structural limits due to maximum tolerable cylinder pressure. If cylinder pressure is controlled in a closed-loop to retain power density at its known maximum tolerable cylinder pressure value, the engine is optimized for maximum power density with respect to its structural limits. This technique is especially useful for military engines.

For the special case in which $P_a$ and $P_o$ are equal, a horizontal slice of the P vs. V plot of FIG. 19 provides an indication of a crank angle difference (CAD) equal to the difference between $P_a$ and $P_o$. The resultant signal has high resolution because it reflects a large variation in lambda vs. angular difference. It is also almost totally insensitive to errors in pressure transducer calibration because it is only required that the two pressures be equal when the angular difference is calculated. This angular difference signal can then be calculated, using a virtual expansion stroke, by mathematically moving the compression stroke from before TDC to after TDC. In this case, the angular difference will change 1) from a value of nearly zero with no fuel added and a lambda value of infinity 2) to a value on the order of 50 degrees at a lambda value of 2.0. Lambda therefore can be determined from the calculated angular difference. The angular difference is also proportional to CPR in this instance, permitting a calculation of CPR at symmetric crank angles. Hence, a difference in crank angle between the compression and expansion strokes at the same preselected values for $P_o$ and $P_a$ can be ascertained and used to determine CPR and lambda.

Pressure measurements can also be used as feedback control for other engine operating parameters such as fuel injection quantity, fuel injection timing, fuel injection pressure and exhaust gas recirculation (EGR).

Many changes and modifications could be made to the invention without departing from the spirit thereof. The scope of some of these changes are discussed above. Other changes and modifications falling within the scope of the invention will become apparent from the appended claims.

We claim:

1. A gas-filled compression ignition internal combustion engine comprising:
   (A) a plurality of cylinders each having an intake port and exhaust port;
   (B) a fuel supply system which selectively supplies a gaseous fuel to said cylinders, wherein said fuel is one which ignites by compression;
   (C) an air supply system which supplies air to said intake ports of said cylinders during engine operation;
   (D) a sensor which directly senses pressure within one of said cylinders; and (E) electronic control means for controlling operation of at least one of said air supply system and said fuel supply system to
(1) determine, based upon signals received from said sensor, an actual cylinder pressure-dependent parameter of said engine prevailing at the time of said measurement,
(2) determine an optimum value of said parameter for optimizing a selected engine performance characteristic at a prevailing engine operating condition, and
(3) automatically adjust at least one engine operating characteristic so as to cause said actual value of said parameter to approach said optimum value of said parameter.

2. A compression ignition internal combustion engine comprising:
(A) a plurality of cylinders each having an intake port and exhaust port;
(B) a fuel supply system which selectively supplies a fuel to said cylinders, wherein said fuel is one which ignites by compression;
(C) an air supply system which supplies air to said intake ports of said cylinders during engine operation, wherein said air supply system comprises
(1) a turbocharger having an air outlet in fluid communication with the intake ports of the cylinders and having an air inlet, and
(2) a supercharger having an air outlet in fluid communication with said air inlet of said turbocharger and having an air inlet, and
(3) a control device which is coupled to said electronic control means and which selectively controls operation of said supercharger;
(D) a sensor which directly senses pressure within one of said cylinders; and
(E) electronic control means for controlling operation of at least one of said air supply system and said fuel supply system to:
(1) determine, based upon signals received from said sensor, an actual cylinder pressure-dependent parameter of said engine prevailing at the time of said measurement,
(2) determine an optimum value of said parameter for optimizing a selected engine performance characteristic at a prevailing engine operating condition, and
(3) automatically adjust at least one engine operating characteristic so as to cause said actual value of said parameter to approach said optimum value of said parameter.

3. A compression ignition engine as defined in claim 2, wherein said air supply system further comprises a turboexpander which is located downstream of said turbocharger.

4. A compression ignition engine as defined in claim 2, wherein said air supply system further comprises a turbo air bypass (TAB) valve which is coupled to said electronic control means and which is actuatable to selectively permit at least partial bypass of said supercharger and said turbocharger.

5. A compression ignition internal combustion engine comprising:
(A) a plurality of cylinders each having an intake port and exhaust port;
(B) a fuel supply system which selectively supplies a fuel to said cylinders, wherein said fuel is one which ignites by compression;
(C) an air supply system which supplies air to said intake ports of said cylinders during engine operation;
(D) a sensor which directly senses pressure within one of said cylinders; and
(E) electronic control means for controlling operation of at least one of said air supply system and said fuel supply system, in order to
(1) determine, based upon signals received from said sensor, an actual cylinder pressure-dependent parameter of said engine prevailing at the time of said measurement,
(2) determine an optimum value of said parameter for optimizing a selected engine performance characteristic at a prevailing engine operating condition, and
(3) automatically adjust at least one engine operating characteristic so as to cause said actual value of said parameter to approach said optimum value of said parameter wherein said parameter is a cylinder pressure ratio, CPR, wherein said electronic control means is operable to determine CPR by, during each thermodynamic cycle in which pressure is sensed, 1) obtaining signals from said sensor inductive of first and second cylinder pressures, $P_a$ and $P_o$, prevailing at two different times during each thermodynamic cycle and 2) dividing $P_a$ by $P_o$ to obtain CPR.

6. A compression ignition engine as defined in claim 5, wherein said sensor is operable, during each thermodynamic cycle in which pressures are sensed and utilized, to sense $P_o$ during a compression stroke of the thermodynamic cycle and to sense $P_a$ after the end of combustion.

7. A method of optimizing operation of a compression ignition engine, comprising:
(A) directly sensing pressure within a cylinder of said compression ignition engine during engine operation;
(B) determining, from said measurement, an actual cylinder pressure-dependent parameter of said engine prevailing at the time of said measurement, wherein said parameter is a cylinder pressure ratio, CPR, and wherein CPR is determined by, during each thermodynamic cycle in which pressure is sensed, 1) sensing first and second cylinder pressures, $P_a$ and $P_o$, at two different times during each thermodynamic cycle and 2) dividing $P_a$ by $P_o$ to obtain CPR;
(C) determining an optimum value of said parameter for optimizing a selected engine performance characteristic at a prevailing engine operating condition;
(D) automatically adjusting at least one engine operating characteristics so as to cause said actual value of said parameter to approach said optimum value of said parameter.

8. A method as defined in claim 2, wherein, during each thermodynamic cycle in which pressures are sensed, $P_o$ is sensed during a compression stroke of the thermodynamic cycle and $P_a$ is sensed after the end of combustion.

9. A method as defined in claim 7, wherein the optimum value of CPR, ($CPR_{OPT}$), is one which strikes an optimum trade-off between BSEC and $BSNO_x$ at prevailing engine operating conditions.

10. A method as defined in claim 7, wherein the optimum value of CPR, ($CPR_{OPT}$), is one which minimizes smoke and particulate emissions at prevailing engine operating conditions.

11. A method as defined in claim 7, wherein the step of determining the optimum value of said parameter comprises determining an optimum value, $CPR_{OPT}$, of CPR.

12. A method as defined in claim 11, wherein the step of determining $CPR_{OPT}$ comprises determining engine load and engine speed and then determining $CPR_{OPT}$ as a function of the determined engine load and the determined engine speed.

13. A method as defined in claim 12, wherein engine load is determined based on the determined speed and a commanded mass of fuel, $Q_{COMM}$, to be delivered to said cylinder in a particular thermodynamic cycle.

14. A method as defined in claim 12, wherein engine load is determined based on the determined speed and a determined value of manifold absolute pressure, MAP.

15. A method as defined in claim 12, wherein engine load is determined based on the determined speed and a determined actual mass of fuel, $M_F$, consumed during a particular thermodynamic cycle.

16. A method as defined in claim 15, wherein $P_o$ and $P_a$ are measured at ±100° from a top dead center position of the cylinder and $M_F$ is determined according to the equation:

$$MF = \left\{ \frac{\kappa-1}{V(100)} \int_{\theta_1}^{100} \left( \frac{V}{V(100)} \right)^{\kappa-1} \left[ \frac{d\mu_F}{d\theta} - \frac{d\mu_{qF}}{d\theta} \right] d\theta \right\} h_c CPD \quad \text{Eq. 8}$$

wherein MF is the actual mass of fuel consumed during the particular thermodynamic cycle; k is an isentropic exponent, ratio of specific heats at constant pressure and constant volume; θ is a crank angle; V is an instantaneous cylinder volume; $\mu_F$ is a burned mass fraction of fuel; $\mu_{qF}$ is an ineffective part of the burned mass fraction of fuel; $h_c$ is the heat of combustion; and CPD is the difference between $P_o$ and $P_a$.

17. A method as defined in claim 15, wherein $M_F$ is determined according to the equation:

$$M_F = \frac{1}{LHV} \int_i^f \frac{dQ_{CH}}{dt} dt \quad \text{Eq. 9}$$

wherein $M_F$ is the actual mass of fuel consumed during a particular thermodynamic cycle; LHV is a fuel Lower Heating Value; i is a start of combustion; f is an end of combustion;

$$\frac{dQ_{CH}}{dt}$$

is the total heat released from fuel chemical energy; and t is time.

18. A method of optimizing operation of a compression ignition engine, comprising:
  (A) directly sensing pressure within a cylinder of said compression ignition engine during engine operation;
  (B) determining, from said measurement, an actual cylinder pressure-dependent parameter of said engine prevailing at the time of said measurement;
  (C) determining an optimum value of said parameter for optimizing a selected engine performance characteristic at a prevailing engine operating condition, wherein the engine operation characteristic is lambda;
  (D) automatically adjusting said operating characteristic so as to cause said actual value of said parameter to approach said optimum value of said parameter, wherein the adjusting step comprises adjusting inlet air pressure for said compression ignition engine.

19. A method of optimizing operation of a compression ignition engine, comprising:
  (A) directly sensing pressure within a cylinder of said compression ignition engine during engine operation;
  (B) determining, from said measurement, an actual cylinder pressure-dependent parameter of said engine prevailing at the time of said measurement;
  (C) determining an optimum value of said parameter for optimizing a selected engine performance characteristic at a prevailing engine operating condition;
  (D) automatically adjusting at least one engine operating characteristics so as to cause said actual value of said parameter to approach said optimum value of said parameter; and
  (E) during at least selected thermodynamic cycles, determining the location and value of a maximum cylinder pressure, MCP.

20. A method as defined in claim 19, further comprising detecting knock by detecting changes in one of CPR, MCP, and a calculated maximum cylinder pressure ratio (MCPR) at constant engine speed, load, lambda, and combustion air temperature.

21. A method as defined in claim 20, further comprising, in response to detecting a knock condition, adjusting at least one engine operating characteristic so as to reduce knock.

22. A method as defined in claim 19, further comprising adjusting at least one parameter of engine operation to optimize power density at the determined MCP.

23. A method as defined in claim 22, wherein the adjusting step comprises adjusting the operation of at least one of a turbocharger and a supercharger.

24. A method as defined in claim 23, wherein the adjustment step further comprises adjusting fuel flow to said compression ignition engine under transient engine operating conditions under which the optimum CPR cannot be obtained by control of airflow alone.

25. A method of optimizing operation of a compression ignition engine, comprising:
  (A) directly sensing pressure within a cylinder of said compression ignition engine during engine operation;
  (B) determining, from said measurement, an actual cylinder pressure-dependent parameter of said engine prevailing at the time of said measurement;
  (C) determining an optimum value of said parameter for optimizing a selected engine performance characteristic at a prevailing engine operating condition, wherein the engine operation characteristic is lambda;
  (D) automatically adjusting at least one engine operating characteristics so as to cause said actual value of said parameter to approach said optimum value of said parameter, wherein the adjusting step comprises adjusting the operation of a supercharger which is located in series with a turbocharger thereby to adjust inlet air pressure for said turbocharger.

26. A method of optimizing operation of a compression ignition engine, comprising:
  (A) directly sensing pressure within a cylinder of said compression ignition engine during engine operation;
  (B) determining, from said measurement, an actual cylinder pressure-dependent parameter of said engine prevailing at the time of said measurement;
  (C) determining an optimum value of said parameter for optimizing a selected engine performance characteristic at a prevailing engine operating condition;
  (D) automatically adjusting at least one engine operating characteristics so as to cause said actual value of said parameter to approach said optimum value of said parameter;
  (E) determining a difference in crank angle between a first pressure value obtained during a compression stroke of a thermodynamic cycle and a second pressure value obtained during an expansion stroke of said thermodynamic cycle; and (F) determining, using the determined crank angle difference, at least one of lambda and a cylinder pressure ratio (CPR).

27. A method of optimizing operation of a compression ignition engine, comprising:
   (A) directly sensing pressure within a cylinder of said compression ignition engine during engine operation;
   (B) determining, from said measurement, an actual cylinder pressure-dependent parameter of said engine prevailing at the time of said measurement;
   (C) determining an optimum value of said parameter for optimizing a selected engine performance characteristic at a prevailing engine operating condition;
   (D) automatically adjusting at least one engine operating characteristics so as to cause said actual value of said parameter to approach said optimum value of said parameter, wherein said compression ignition engine is a liquid-fueled engine.

28. A method of optimizing operation of a compression ignition engine, comprising, for each cylinder of said compression ignition engine and during each thermodynamic cycle of said compression ignition engine:
   (A) directly sensing first and second values, $P_o$ and $P_a$, of absolute pressure within the cylinder, wherein $P_o$ is sensed during a compression stroke of the thermodynamic cycle and $P_a$ is sensed after the end of combustion, and wherein $P_o$ and $P_a$ are sensed using an in-cylinder optic fiber optic sensor;
   (B) dividing $P_a$ by $P_o$ to obtain an actual value of a cylinder pressure ratio, CPR;
   (C) determining an optimum value of CPR for said compression ignition engine as a function of engine load and engine speed;
   (D) automatically adjusting at least one engine operating characteristic so as to vary air/fuel ratio, lambda, within the cylinder to cause said actual value of CPR approach said optimum value of CPR.

* * * * *